(12) United States Patent
Kadiri et al.

(10) Patent No.: US 11,909,535 B2
(45) Date of Patent: Feb. 20, 2024

(54) OPERATING IN A RADIO LINK CONTROL ACKNOWLEDGED MODE USING A MULTICAST OR BROADCAST RADIO BEARER

(71) Applicant: QUALCOMM Incorporated, San Diego, CA (US)

(72) Inventors: Prasad Reddy Kadiri, San Diego, CA (US); Sitaramanjaneyulu Kanamarlapudi, San Diego, CA (US); Gavin Bernard Horn, La Jolla, CA (US); Umesh Phuyal, San Diego, CA (US); Xipeng Zhu, San Diego, CA (US); Alberto Rico Alvarino, San Diego, CA (US); Miguel Griot, La Jolla, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 17/069,038

(22) Filed: Oct. 13, 2020

(65) Prior Publication Data
US 2021/0126745 A1 Apr. 29, 2021

Related U.S. Application Data

(60) Provisional application No. 62/925,561, filed on Oct. 24, 2019.

(51) Int. Cl.
*H04L 1/1829* (2023.01)
*H04W 80/08* (2009.01)
(Continued)

(52) U.S. Cl.
CPC .......... *H04L 1/1832* (2013.01); *H04L 1/1685* (2013.01); *H04L 1/187* (2013.01);
(Continued)

(58) Field of Classification Search
None
See application file for complete search history.

(56) References Cited

U.S. PATENT DOCUMENTS

2006/0154603 A1 * 7/2006 Sachs .................. H04L 12/1868
455/39
2007/0258591 A1 11/2007 Terry et al.
(Continued)

FOREIGN PATENT DOCUMENTS

CA 2362393 C * 5/2012 ........... H04L 1/1614
CA 3049157 A1 * 7/2018 ........... H04L 1/1621
(Continued)

OTHER PUBLICATIONS

International Search Report and Written Opinion—PCT/US2020/055518—ISA/EPO—dated Feb. 4, 2021.

*Primary Examiner* — Jay L Vogel
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive a configuration for a multicast or broadcast radio bearer (MRB) in a radio link control (RLC) acknowledged mode (AM). The UE may determine an adjustment of an RLC AM transmission window of a base station. The RLC AM transmission window may be associated with retransmission of RLC packets associated with the MRB. The UE may synchronize an RLC AM reception window of the UE with the RLC AM transmission window based at least in part on determining the adjustment of the RLC AM transmission window of the base station. The RLC AM reception window may be associated with reassembly of RLC packets associated with the MRB. Numerous other aspects are provided.

30 Claims, 18 Drawing Sheets

(51) Int. Cl.
    *H04W 28/06*       (2009.01)
    *H04L 1/1607*     (2023.01)
    *H04L 1/1812*     (2023.01)
    *H04L 5/00*        (2006.01)
    *H04L 1/1867*     (2023.01)
    *H04L 1/00*        (2006.01)

(52) U.S. Cl.
    CPC .......... *H04L 1/1819* (2013.01); *H04L 1/1864* (2013.01); *H04L 5/0055* (2013.01); *H04W 28/065* (2013.01); *H04W 80/08* (2013.01); *H04L 2001/0093* (2013.01)

(56) References Cited

U.S. PATENT DOCUMENTS

| | | | |
|---|---|---|---|
| 2008/0043619 A1* | 2/2008 | Sammour | H04L 1/187 370/231 |
| 2014/0003320 A1* | 1/2014 | Etemad | H04W 4/08 370/312 |
| 2017/0171060 A1* | 6/2017 | Liu | H04L 67/60 |
| 2017/0230434 A1* | 8/2017 | Wang | H04L 65/70 |
| 2017/0251499 A1 | 8/2017 | Radulescu et al. | |
| 2017/0317727 A1* | 11/2017 | Wang | H04B 7/0452 |
| 2017/0317963 A1* | 11/2017 | Gupta | G06N 5/01 |
| 2018/0109996 A1* | 4/2018 | Wang | H04W 4/08 |
| 2018/0324642 A1* | 11/2018 | Yu | H04L 5/0053 |
| 2019/0037603 A1 | 1/2019 | Damnjanovic et al. | |
| 2019/0191279 A1* | 6/2019 | Fujishiro | H04W 72/0446 |
| 2019/0253926 A1* | 8/2019 | Kim | H04W 28/06 |
| 2022/0109636 A1* | 4/2022 | Wang | H04L 5/0055 |

FOREIGN PATENT DOCUMENTS

| | | | | |
|---|---|---|---|---|
| CN | 104836646 A | | 8/2015 | |
| JP | 2010518699 A | * | 5/2010 | |
| WO | WO-2007023520 A1 | * | 3/2007 | ............ H04L 1/1607 |
| WO | WO-2017196058 A1 | * | 11/2017 | ......... H04W 36/0061 |
| WO | WO-2018028497 A1 | * | 2/2018 | |
| WO | 2018204828 A1 | | 11/2018 | |

\* cited by examiner

OPERATING IN A RADIO LINK CONTROL ACKNOWLEDGED MODE USING A MULTICAST OR BROADCAST RADIO BEARER

CROSS-REFERENCE TO RELATED APPLICATION

This Patent application claims priority to U.S. Provisional Patent Application No. 62/925,561, filed on Oct. 24, 2019, entitled "OPERATING IN A RADIO LINK CONTROL ACKNOWLEDGED MODE USING A MULTICAST OR BROADCAST RADIO BEARER," and assigned to the assignee hereof. The disclosure of the prior application is considered part of and is incorporated by reference in this Patent application.

FIELD OF THE DISCLOSURE

Aspects of the present disclosure generally relate to wireless communication and specifically, to techniques and apparatuses for operating in a radio link control acknowledged mode using a multicast or broadcast radio bearer.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

Support for multicast or broadcast (sometimes referred to herein as multicast/broadcast) services is being added to NR. In NR, a UE may be capable of receiving, for example, multicast/broadcast services in a mixed mode or a broadcast mode. Using mixed mode, multicast/broadcast services may be delivered using either a multicast or broadcast radio bearer (MRB) or a dedicated radio bearer (DRB) for a UE in a radio resource control (RRC) connected state. Using broadcast mode, multicast/broadcast services may be delivered using an MRB for a UE in an RRC connected state, an RRC idle state, or an RRC inactive state.

SUMMARY

In some aspects, a method of wireless communication, performed by a user equipment (UE), may include receiving a configuration for a multicast or broadcast radio bearer (MRB) in a radio link control (RLC) acknowledged mode (AM). The method may include determining an adjustment of an RLC AM transmission window of a base station, the RLC AM transmission window being associated with retransmission of RLC packets associated with the MRB. The method may include synchronizing an RLC AM reception window of the UE with the RLC AM transmission window based at least in part on determining the adjustment of the RLC AM transmission window of the base station, the RLC AM reception window being associated with reassembly of RLC packets associated with the MRB.

In some aspects, a method of wireless communication, performed by a UE, may include receiving a configuration for an MRB in an RLC AM. The method may include determining whether to use in-sequence delivery or out-of-sequence delivery to deliver RLC packets to a packet data convergence protocol (PDCP) layer of the UE based at least in part on the configuration for the MRB. The method may include delivering RLC packets to the PDCP layer in sequence or out of sequence based at least in part on determining whether to use in-sequence delivery or out-of-sequence delivery to deliver RLC packets to the PDCP layer.

In some aspects, a method of wireless communication, performed by a UE, may include receiving a configuration for an MRB in an RLC AM. The method may include determining to transmit an RLC status report, indicating one or more negative acknowledgments (NACKs) for one or more RLC packets, based at least in part on at least one of: expiration of a timer associated with transmission of the RLC status report, a determination that a quantity of unreceived RLC packets or a quantity of unreceived bytes satisfies a threshold, reception of an RLC packet with a sequence number having a threshold offset from a sequence number of an unreceived RLC packet, reception of a polling request and a determination that a randomly generated number satisfies a configured condition for the MRB, or reception of a group-specific polling request that includes a value that matches at least a portion of an identifier associated with the UE. The method may include transmitting the RLC status report based at least in part on determining to transmit the RLC status report.

In some aspects, a method of wireless communication, performed by a base station, may include configuring a set of UEs for a multicast or broadcast traffic flow using an RLC AM. The method may include determining an adjustment of an RLC AM transmission window of the base station, the RLC AM transmission window being associated with retransmission of RLC packets associated with the multicast or broadcast traffic flow. The method may include transmitting, to one or more UEs of the set of UEs, an indication of the adjustment of the RLC AM transmission window.

In some aspects, a method of wireless communication, performed by a base station, may include configuring a set of UEs for a multicast or broadcast traffic flow using an RLC AM. The method may include transmitting a polling request to one or more UEs of the set of UEs, wherein the polling request is associated with at least one of: a condition, for the multicast or broadcast traffic flow, that controls whether a UE responds to the polling request with an RLC status report, or a value, included in the polling request, that controls whether the UE responds to the polling request with the RLC status report based at least in part on the value matching at least a portion of an identifier associated with the UE.

In some aspects, a UE for wireless communication may include memory and one or more processors operatively coupled to the memory. The memory and the one or more processors may be configured to receive a configuration for an MRB in an RLC AM. The memory and the one or more processors may be configured to determine an adjustment of an RLC AM transmission window of a base station, the RLC AM transmission window being associated with retransmission of RLC packets associated with the MRB. The memory and the one or more processors may be configured to synchronize an RLC AM reception window of the UE with the RLC AM transmission window based at least in part on determining the adjustment of the RLC AM transmission window of the base station, the RLC AM reception window being associated with reassembly of RLC packets associated with the MRB.

In some aspects, a UE for wireless communication may include memory and one or more processors operatively coupled to the memory. The memory and the one or more processors may be configured to receive a configuration for an MRB in an RLC AM. The memory and the one or more processors may be configured to determine whether to use in-sequence delivery or out-of-sequence delivery to deliver RLC packets to a PDCP layer of the UE based at least in part on the configuration for the MRB. The memory and the one or more processors may be configured to deliver RLC packets to the PDCP layer in sequence or out of sequence based at least in part on determining whether to use in-sequence delivery or out-of-sequence delivery to deliver RLC packets to the PDCP layer.

In some aspects, a UE for wireless communication may include memory and one or more processors operatively coupled to the memory. The memory and the one or more processors may be configured to receive a configuration for an MRB in an RLC AM. The memory and the one or more processors may be configured to determine to transmit an RLC status report, indicating one or more NACKs for one or more RLC packets, based at least in part on at least one of: expiration of a timer associated with transmission of the RLC status report, a determination that a quantity of unreceived RLC packets or a quantity of unreceived bytes satisfies a threshold, reception of an RLC packet with a sequence number having a threshold offset from a sequence number of an unreceived RLC packet, reception of a polling request and a determination that a randomly generated number satisfies a configured condition for the MRB, or reception of a group-specific polling request that includes a value that matches at least a portion of an identifier associated with the UE. The memory and the one or more processors may be configured to transmit the RLC status report based at least in part on determining to transmit the RLC status report.

In some aspects, a base station for wireless communication may include memory and one or more processors operatively coupled to the memory. The memory and the one or more processors may be configured to configure a set of UEs for a multicast or broadcast traffic flow using an RLC AM. The memory and the one or more processors may be configured to determine an adjustment of an RLC AM transmission window of the base station, the RLC AM transmission window being associated with retransmission of RLC packets associated with the multicast or broadcast traffic flow. The memory and the one or more processors may be configured to transmit, to one or more UEs of the set of UEs, an indication of the adjustment of the RLC AM transmission window.

In some aspects, a base station for wireless communication may include memory and one or more processors operatively coupled to the memory. The memory and the one or more processors may be configured to configure a set of UEs for a multicast or broadcast traffic flow using an RLC AM. The memory and the one or more processors may be configured to transmit a polling request to one or more UEs of the set of UEs, wherein the polling request is associated with at least one of: a condition, for the multicast or broadcast traffic flow, that controls whether a UE responds to the polling request with an RLC status report, or a value, included in the polling request, that controls whether the UE responds to the polling request with the RLC status report based at least in part on the value matching at least a portion of an identifier associated with the UE.

In some aspects, a non-transitory computer-readable medium may store one or more instructions for wireless communication. The one or more instructions, when executed by one or more processors of a UE, may cause the UE to receive a configuration for an MRB in an RLC AM. The one or more instructions may cause the UE to determine an adjustment of an RLC AM transmission window of a base station, the RLC AM transmission window being associated with retransmission of RLC packets associated with the MRB. The one or more instructions may cause the UE to synchronize an RLC AM reception window of the UE with the RLC AM transmission window based at least in part on determining the adjustment of the RLC AM transmission window of the base station, the RLC AM reception window being associated with reassembly of RLC packets associated with the MRB.

In some aspects, a non-transitory computer-readable medium may store one or more instructions for wireless communication. The one or more instructions, when executed by one or more processors of a UE, may cause the UE to receive a configuration for an MRB in an RLC AM. The one or more instructions may cause the UE to determine whether to use in-sequence delivery or out-of-sequence delivery to deliver RLC packets to a PDCP layer of the UE based at least in part on the configuration for the MRB. The one or more instructions may cause the UE to deliver RLC packets to the PDCP layer in sequence or out of sequence based at least in part on determining whether to use in-sequence delivery or out-of-sequence delivery to deliver RLC packets to the PDCP layer.

In some aspects, a non-transitory computer-readable medium may store one or more instructions for wireless communication. The one or more instructions, when executed by one or more processors of a UE, may cause the UE to receive a configuration for an MRB in an RLC AM.

The one or more instructions may cause the UE to determine to transmit an RLC status report, indicating one or more NACKs for one or more RLC packets, based at least in part on at least one of: expiration of a timer associated with transmission of the RLC status report, a determination that a quantity of unreceived RLC packets or a quantity of unreceived bytes satisfies a threshold, reception of an RLC packet with a sequence number having a threshold offset from a sequence number of an unreceived RLC packet, reception of a polling request and a determination that a randomly generated number satisfies a configured condition for the MRB, or reception of a group-specific polling request that includes a value that matches at least a portion of an identifier associated with the UE. The one or more instructions may cause the UE to transmit the RLC status report based at least in part on determining to transmit the RLC status report.

In some aspects, a non-transitory computer-readable medium may store one or more instructions for wireless communication. The one or more instructions, when executed by one or more processors of a base station, may cause the base station to configure a set of UEs for a multicast or broadcast traffic flow using an RLC AM. The one or more instructions may cause the base station to determine an adjustment of an RLC AM transmission window of the base station, the RLC AM transmission window being associated with retransmission of RLC packets associated with the multicast or broadcast traffic flow. The one or more instructions may cause the base station to transmit, to one or more UEs of the set of UEs, an indication of the adjustment of the RLC AM transmission window.

In some aspects, a non-transitory computer-readable medium may store one or more instructions for wireless communication. The one or more instructions, when executed by one or more processors of a base station, may cause the base station to configure a set of UEs for a multicast or broadcast traffic flow using an RLC AM. The one or more instructions may cause the base station to transmit a polling request to one or more UEs of the set of UEs, wherein the polling request is associated with at least one of: a condition, for the multicast or broadcast traffic flow, that controls whether a UE responds to the polling request with an RLC status report, or a value, included in the polling request, that controls whether the UE responds to the polling request with the RLC status report based at least in part on the value matching at least a portion of an identifier associated with the UE.

In some aspects, an apparatus for wireless communication may include means for receiving a configuration for an MRB in an RLC AM. The apparatus may include means for determining an adjustment of an RLC AM transmission window of a base station, the RLC AM transmission window being associated with retransmission of RLC packets associated with the MRB. The apparatus may include means for synchronizing an RLC AM reception window of the apparatus with the RLC AM transmission window based at least in part on determining the adjustment of the RLC AM transmission window of the base station, the RLC AM reception window being associated with reassembly of RLC packets associated with the MRB.

In some aspects, an apparatus for wireless communication may include means for receiving a configuration for an MRB in an RLC AM. The apparatus may include means for determining whether to use in-sequence delivery or out-of-sequence delivery to deliver RLC packets to a PDCP layer of the apparatus based at least in part on the configuration for the MRB. The apparatus may include means for delivering RLC packets to the PDCP layer in sequence or out of sequence based at least in part on determining whether to use in-sequence delivery or out-of-sequence delivery to deliver RLC packets to the PDCP layer.

In some aspects, an apparatus for wireless communication may include means for receiving a configuration for an MRB in an RLC AM. The apparatus may include means for determining to transmit an RLC status report, indicating one or more NACKs for one or more RLC packets, based at least in part on at least one of: expiration of a timer associated with transmission of the RLC status report, a determination that a quantity of unreceived RLC packets or a quantity of unreceived bytes satisfies a threshold, reception of an RLC packet with a sequence number having a threshold offset from a sequence number of an unreceived RLC packet, reception of a polling request and a determination that a randomly generated number satisfies a configured condition for the MRB, or reception of a group-specific polling request that includes a value that matches at least a portion of an identifier associated with the apparatus. The apparatus may include means for transmitting the RLC status report based at least in part on determining to transmit the RLC status report.

In some aspects, an apparatus for wireless communication may include means for configuring a set of UEs for a multicast or broadcast traffic flow using an RLC AM. The apparatus may include means for determining an adjustment of an RLC AM transmission window of the apparatus, the RLC AM transmission window being associated with retransmission of RLC packets associated with the multicast or broadcast traffic flow. The apparatus may include means for transmitting, to one or more UEs of the set of UEs, an indication of the adjustment of the RLC AM transmission window.

In some aspects, an apparatus for wireless communication may include means for configuring a set of UEs for a multicast or broadcast traffic flow using an RLC AM. The apparatus may include means for transmitting a polling request to one or more UEs of the set of UEs, wherein the polling request is associated with at least one of: a condition, for the multicast or broadcast traffic flow, that controls whether a UE responds to the polling request with an RLC status report, or a value, included in the polling request, that controls whether the UE responds to the polling request with the RLC status report based at least in part on the value matching at least a portion of an identifier associated with the UE.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
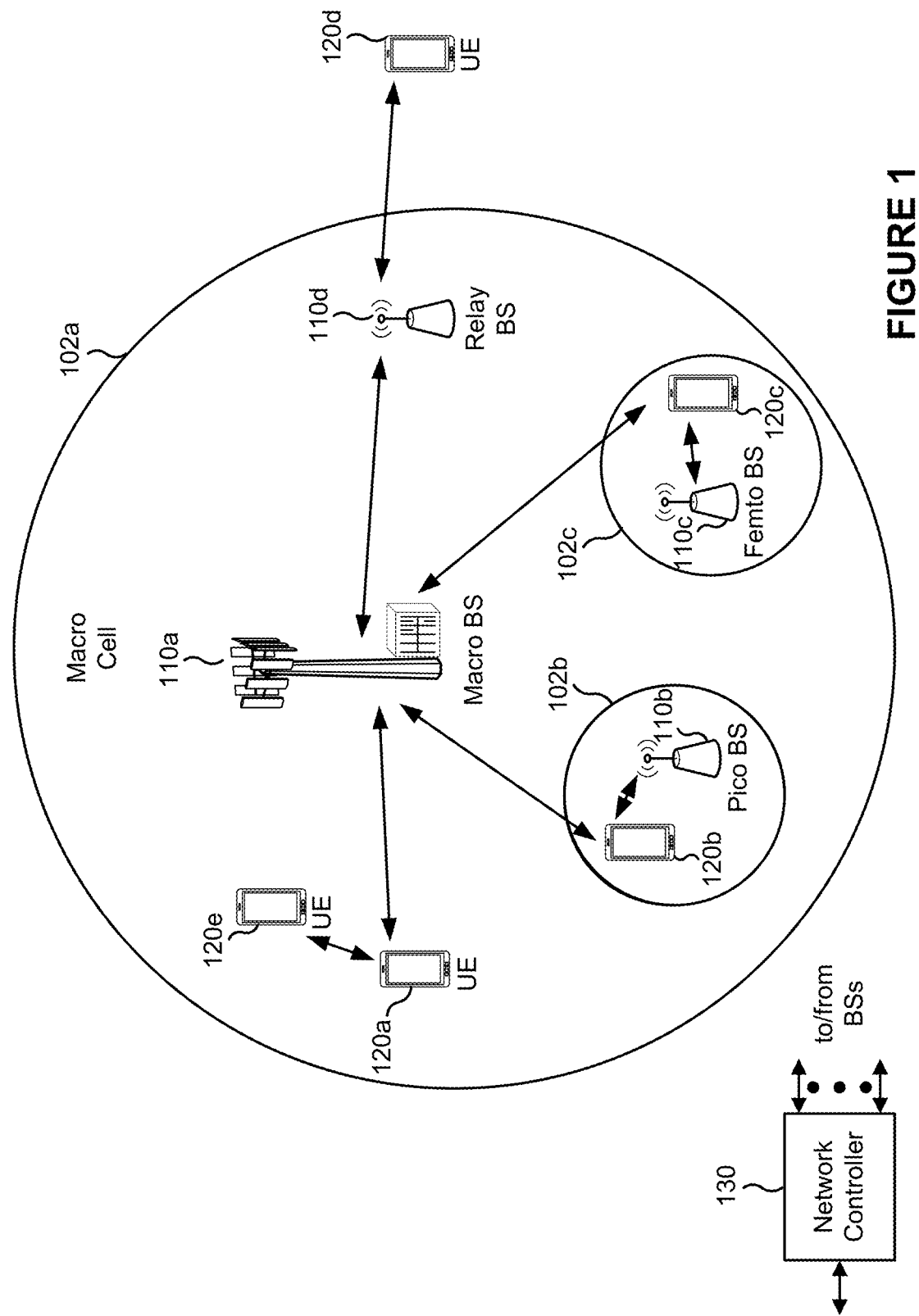
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

Support for multicast or broadcast (sometimes referred to herein as multicast/broadcast) services is being added to New Radio (NR). In NR, a user equipment (UE) may be capable of receiving, for example, multicast/broadcast services in a mixed mode or a broadcast mode. Using mixed mode, multicast/broadcast services may be delivered using either a multicast/broadcast radio bearer (MRB) or a dedicated radio bearer (DRB) for a UE in a radio resource control (RRC) connected state. Using broadcast mode, multicast/broadcast services may be delivered using an MRB for a UE in an RRC connected state, an RRC idle state, or an RRC inactive state.

Various aspects relate generally to enabling a UE to receive multicast/broadcast traffic while in an RRC connected state, an RRC idle state, an RRC inactive state, or across different RRC states. Some aspects more specifically relate to configuring a UE with an MRB in a radio link control (RLC) acknowledged mode (AM). In some aspects, the UE may determine an adjustment of an RLC AM transmission window of a base station. The RLC AM transmission window may be associated with retransmission of RLC packets associated with the MRB. In some aspects, the UE may synchronize an RLC AM reception window of the UE with the RLC AM transmission window based at least in part on determining the adjustment of the RLC AM transmission window of the base station. The RLC AM reception window may be associated with reassembly of RLC packets associated with the MRB.

Particular aspects of the subject matter described in this disclosure can be implemented to realize one or more of the following potential advantages. In some examples, the described techniques can be used to reduce latency that may result from a lack of movement of an RLC AM window, among other examples. Furthermore, the described techniques can be used to improve reliability of communications via the MRB by enabling retransmissions in an RLC AM.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary; rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some examples, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Figure 2:
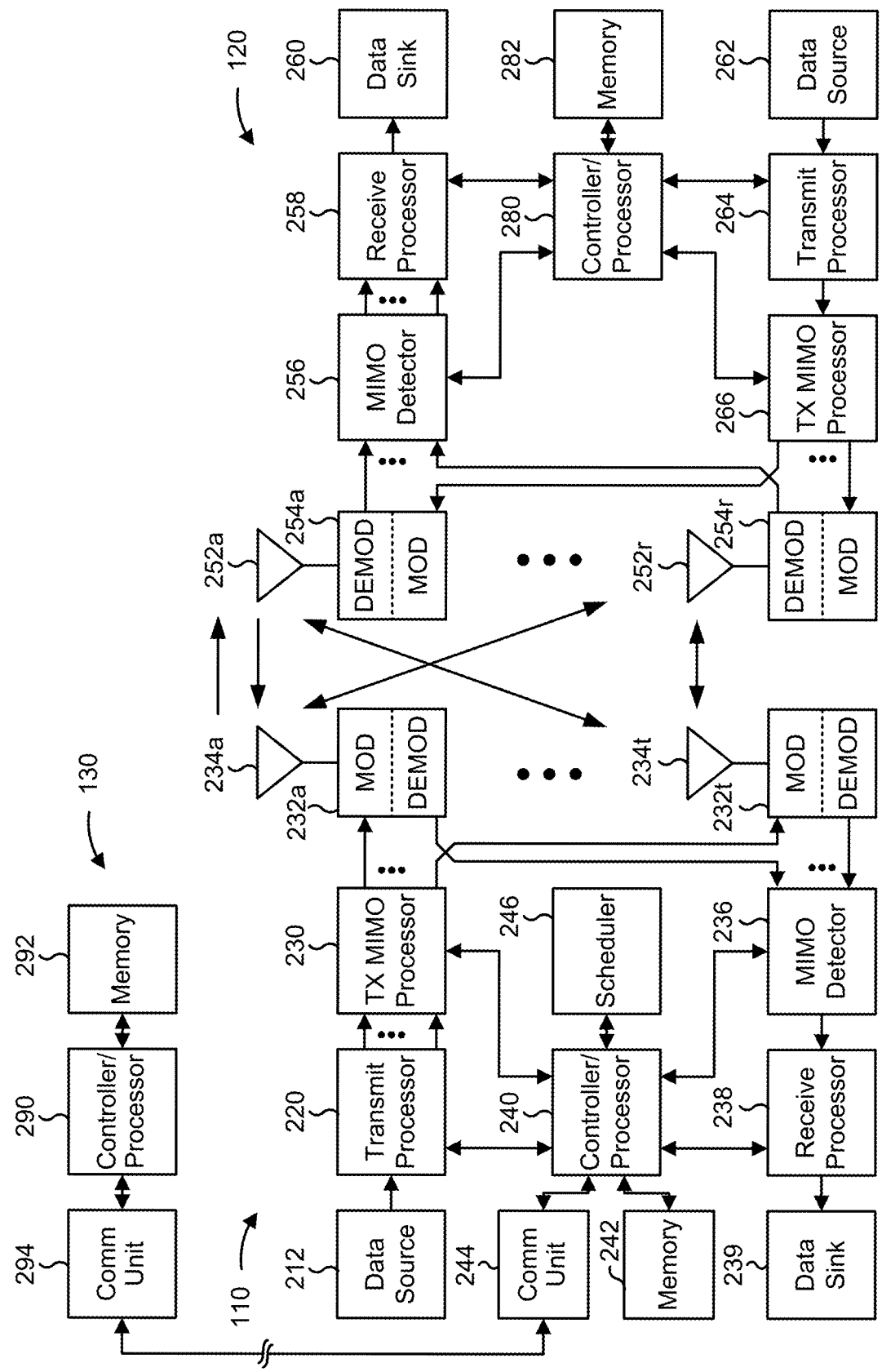
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with operating in a radio link control (RLC) acknowledged mode (AM) using a multicast or broadcast radio bearer (MRB), as described in more detail herein. For example, controller/processor 240 of base station 110, controller/processor 280 of UE 120, or any other component(s) of FIG. 2 may perform or direct operations of, for example, the process of FIG. 9, the process of FIG. 10, the process of FIG. 11, the process of FIG. 12, the process of FIG. 13, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a configuration for an MRB in an RLC AM; means for determining an adjustment of an RLC AM transmission window of a base station, the RLC AM transmission window being associated with retransmission of RLC packets associated with the MRB; means for synchronizing an RLC AM reception window of the UE 120 with the RLC AM transmission window based at least in part on determining the adjustment of the RLC AM transmission window of the base station, the RLC AM reception window being associated with reassembly of RLC packets associated with the MRB; or combinations thereof, among other examples. Additionally or alternatively, UE 120 may include means for receiving a configuration for an MRB in an RLC AM; means for determining whether to use in-sequence delivery or out-of-sequence delivery to deliver RLC packets to a PDCP layer of the UE 120 based at least in part on the configuration for the MRB; means for delivering RLC packets to the PDCP layer in sequence or out of sequence based at least in part on determining whether to use in-sequence delivery or out-of-sequence delivery to deliver RLC packets to the PDCP layer; or combinations thereof, among other examples. Additionally or alternatively, UE 120 may include means for receiving a configuration for an MRB in an RLC AM; means for determining to transmit an RLC status report, indicating one or more NACKs for one or more RLC packets, based at least in part on at least one of: expiration of a timer associated with transmission of the RLC status report, a determination that a quantity of unreceived RLC packets or a quantity of unreceived bytes satisfies a threshold, reception of an RLC packet with a sequence number having a threshold offset from a sequence number of an unreceived RLC packet, reception of a polling request and a determination that a randomly generated number satisfies a configured condition for the MRB, or reception of a group-specific polling request that includes a value that matches at least a portion of an identifier associated with the UE 120; means for transmitting the RLC status report based at least in part on determining to transmit the RLC status report; or combinations thereof, among other examples. In some aspects, such means may include one or more components of UE 120 described in connection with FIG. 2.

In some aspects, base station 110 may include means for configuring a set of UEs for a multicast or broadcast traffic flow using an RLC AM; means for determining an adjustment of an RLC AM transmission window of the apparatus, the RLC AM transmission window being associated with retransmission of RLC packets associated with the multicast or broadcast traffic flow; means for transmitting, to one or more UEs of the set of UEs, an indication of the adjustment of the RLC AM transmission window; or combinations thereof, among other examples. Additionally or alternatively, base station 110 may include means for configuring a set of UEs for a multicast or broadcast traffic flow using an RLC AM; means for transmitting a polling request to one or more UEs of the set of UEs, wherein the polling request is associated with at least one of: a condition, for the multicast or broadcast traffic flow, that controls whether a UE responds to the polling request with an RLC status report, or a value, included in the polling request, that controls whether the UE responds to the polling request with the RLC status report based at least in part on the value matching at least a portion of an identifier associated with the UE; or combinations thereof, among other examples. In some aspects, such means may include one or more components of base station 110 described in connection with FIG. 2.

Figure 3:
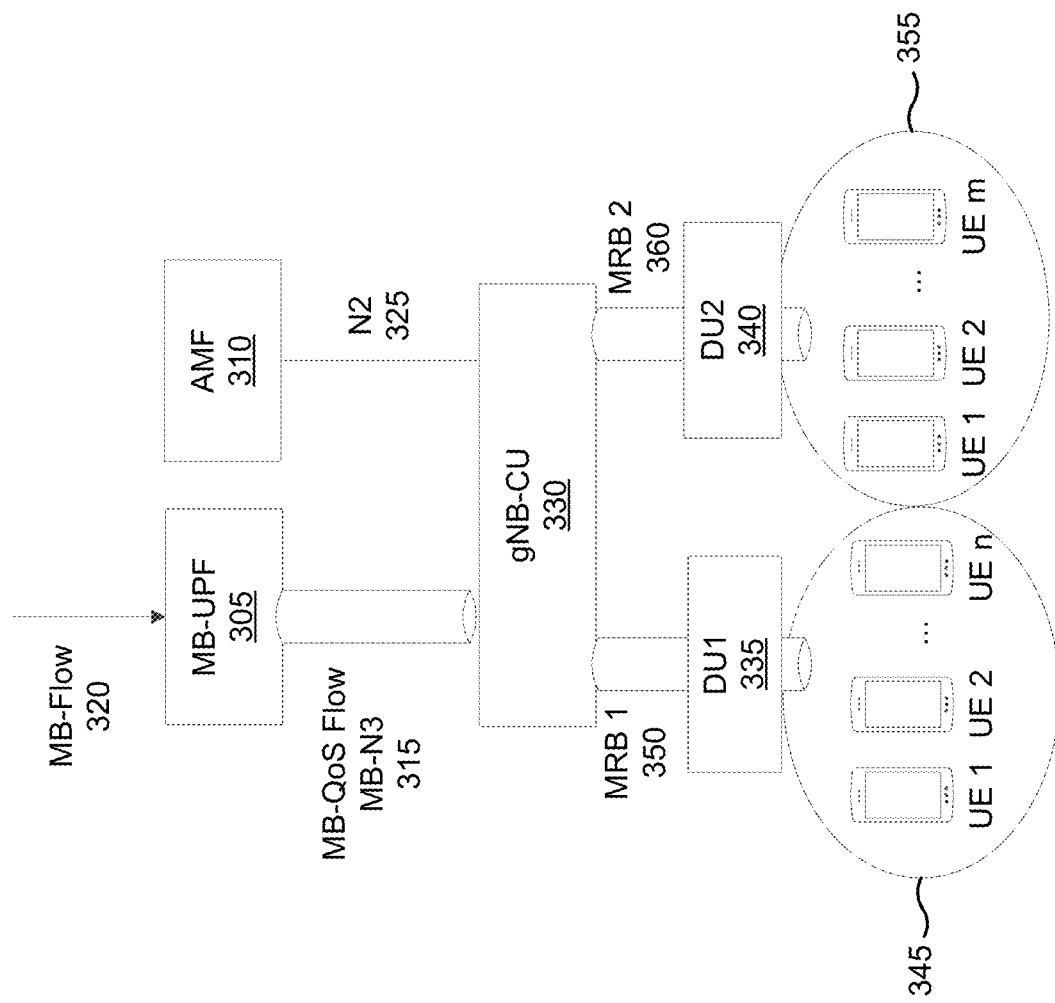
FIG. 3 is a block diagram illustrating a logical architecture of a distributed radio access network (RAN) in accordance with various aspects of the present disclosure.

FIG. 3 is a block diagram illustrating a logical architecture of a distributed radio access network (RAN) in accordance with various aspects of the present disclosure. One or more entities of a 5G network may have a multicast/broadcast (MB) user plane function (MB-UPF) 305 and an access and mobility function (AMF) 310. The MB-UPF 305 may have an N3 interface 315 for delivering an MB-flow 320 of packets (for example, in the form of protocol data units (PDUs)) to a 5G access node, such as a gNB. The AMF 310 may control signaling for MB-flow setup and modification using an N2 interface 325 with the gNB.

The gNB may include a central unit (CU), shown as gNB-CU 330. The gNB may also include one or more distributed units (DUs), shown as DU1 335 and DU2 340. The DU1 335 and the DU2 340 may be configured to individually (for example, via dynamic selection) or jointly (for example, via joint transmission) serve traffic to UEs. As shown, DU1 335 may serve traffic to a first UE or a first group of UEs 345 using a first multicast/broadcast radio bearer (MRB), shown as MRB1 350, and DU2 340 may serve traffic to a second UE or a second group of UEs 355 using a second MRB, shown as MRB2 360.

Support for multicast or broadcast (sometimes referred to herein as multicast/broadcast) services is being added to NR. In NR, a UE may be capable of receiving, for example, multicast/broadcast services in a mixed mode or a broadcast mode. Using mixed mode, multicast/broadcast services may be delivered using either an MRB (a multicast/broadcast bearer) or a dedicated radio bearer (DRB) for a UE in an RRC connected state. Using broadcast mode, multicast/broadcast services may be delivered using an MRB for a UE in an RRC connected state, an RRC idle state, or an RRC inactive state. Some techniques and apparatuses described herein enable a UE to reliably receive multicast/broadcast traffic while in an RRC connected state, an RRC idle state, an RRC inactive state, or across different RRC states. For example, some techniques and apparatuses described herein reduce latency that may result from a lack of movement of an RLC acknowledged mode window, reduce latency that may result from lack of movement of a packet data convergence protocol (PDCP) window, or reduce network load associated with transmission of an RLC status report, among other examples.

Figure 4:
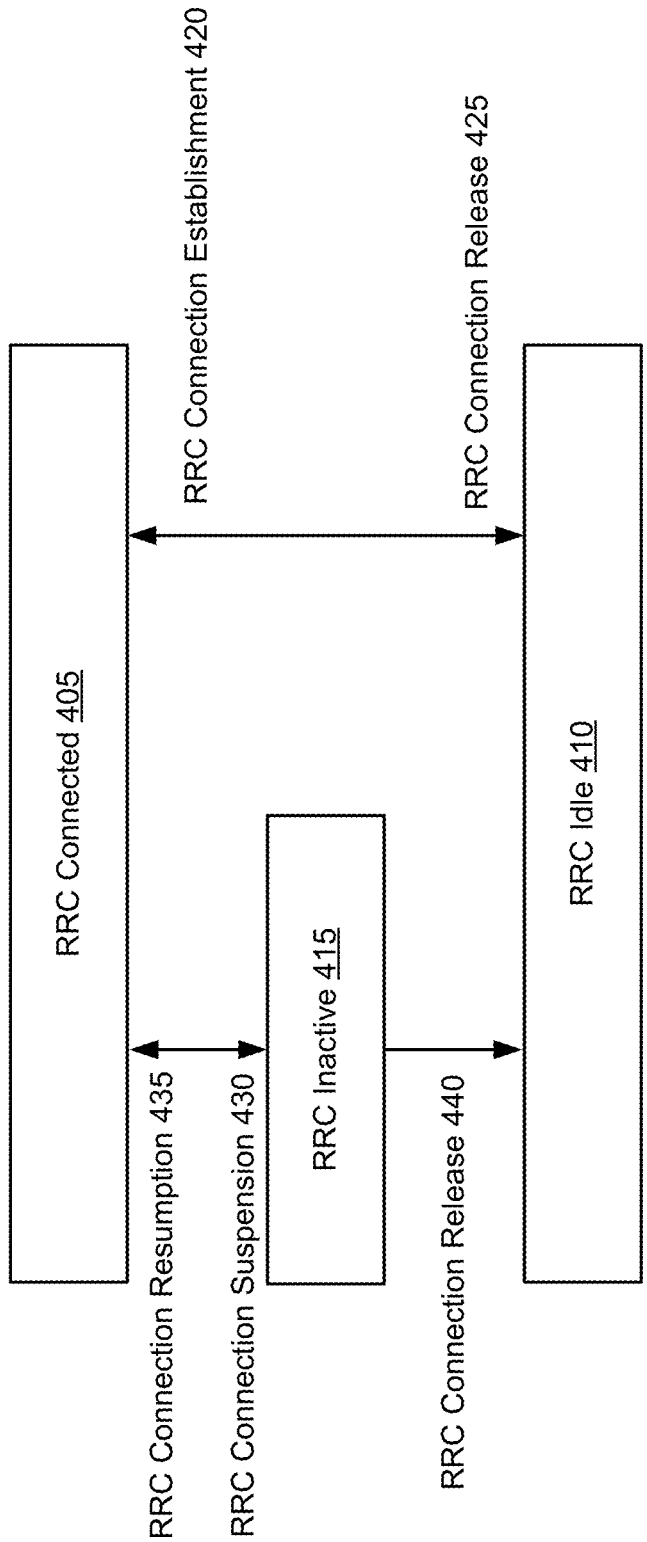
FIG. 4 is a state machine diagram illustrating states of a radio resource control procedure and transitions between the states in accordance with various aspects of the present disclosure.

FIG. 4 is a state machine diagram illustrating states of a radio resource control (RRC) procedure and transitions between the states in accordance with various aspects of the present disclosure. As shown, a UE may transition among an RRC connected state 405, an RRC idle state 410, and an RRC inactive state 415. An RRC procedure may be used, for example, for connection establishment, re-establishment, or release between a UE and a base station, for on-demand transfer of system information, for suspension or resumption of an RRC connection, for signaling relating to handover, or for radio link handling, among other examples.

Upon powering on, a UE may enter the RRC idle state 410. The UE may transition from the RRC idle state 410 to the RRC connected state 405 via RRC connection establishment 420 (sometimes referred to as attaching to the network). The UE may transition from the RRC connected state 405 to the RRC idle state 410 via RRC connection release 425 (sometimes referred to as detaching from the network) or due to a connection failure. Alternatively, the UE may transition from the RRC connected state 405 to the RRC inactive state 415 via RRC connection suspension 430 (also referred to as RRC suspend or RRC release with suspend). In the RRC inactive state, the UE maintains the RRC connection while reducing signaling and power consumption. In the RRC inactive state 415, the UE may transition to the RRC connected state 405 via RRC connection resumption 435 (also referred to as RRC resume), or may transition to the RRC idle state 410 via RRC connection release 440 or due to a connection failure. In the RRC connected state 405 and the RRC inactive state 415, the UE is registered with and connected to the core network. In the RRC idle state 410, the UE is de-registered from the core network.

In the RRC connected state 405, a core network to RAN connection may be established for the UE for both the user plane and the control plane, the UE may be capable of communicating using the RAN connection (for example, a base station connection) and the core network, the UE and the RAN may store an access stratum context for the UE, the RAN may store information indicating the cell that is serving the UE, unicast data may be transferred between the RAN and the UE, the network may control mobility of the UE (including, for example, UE measurements), and the UE may be capable of operating in a connected mode discontinuous reception (CDRX) mode for power saving.

In the RRC idle state 410, the UE may be capable of selecting a public land mobile network (PLMN), receiving system information messages, having mobility for cell re-selection, receiving pages initiated and managed by the core network, and operating in a discontinuous reception (DRX) mode for power saving.

In the RRC inactive state 415, the UE may be capable of receiving system information messages, having mobility for cell re-selection, receiving pages initiated and managed by the RAN, and operating in a DRX mode for power saving. Furthermore, an RRC connection between the UE and the RAN (and the RAN and the core network) remains established for the UE, the UE continues to store an access stratum context for the UE, and the RAN may continue to store information indicating the cell that is serving the UE.

Because both the UE and the base station store an access stratum context for the UE in the RRC inactive state 415, transitioning from the RRC inactive state 415 to the RRC connected state 405 does not require non-access stratum (NAS) signaling, which extends UE battery life and reduces latency in transitioning to the RRC connected state 405 as compared to transitioning from the RRC idle state 410 to the RRC connected state 405. In some aspects, the UE may transition from the RRC connected state 405 to the RRC inactive state 415 due to lack of activity (for example, based at least in part on a timer).

Some techniques and apparatuses described herein enable a UE to reliably receive multicast/broadcast traffic while in an RRC connected state, an RRC idle state, an RRC inactive state, or across different RRC states.

Figure 5:
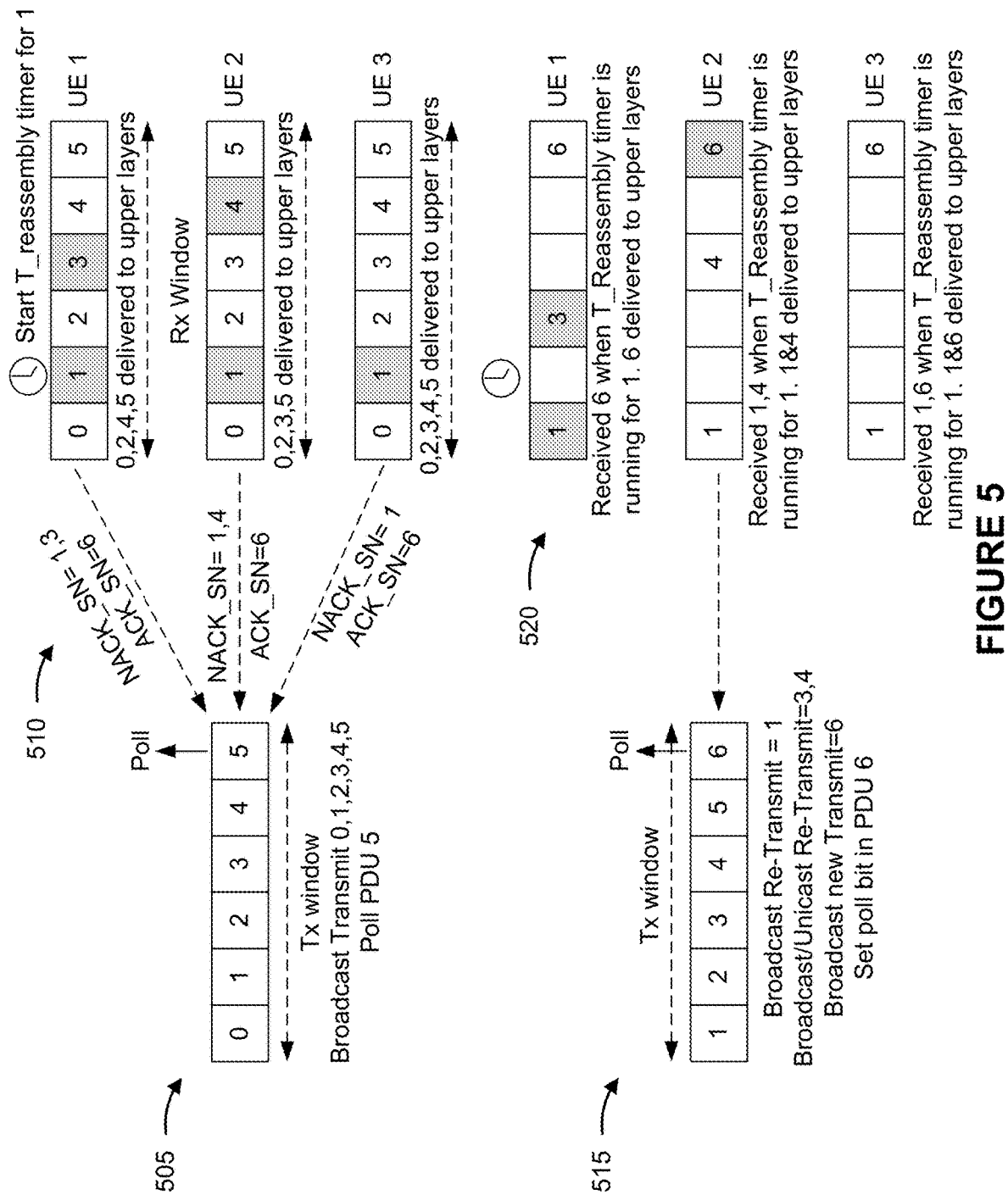
FIG. 5 is a diagram illustrating an example of radio link control (RLC) window adjustment in accordance with various aspects of the present disclosure.

FIG. 5 is a diagram illustrating an example of RLC window adjustment in accordance with various aspects of the present disclosure. The procedure described in connection with FIG. 5 may be used by a base station to control or adjust an RLC AM transmission window.

In a first operation 505, the base station may perform multicast or broadcast transmission (such as via one or more MRBs to one or more UEs) of RLC packets. To prevent the number of RLC packets stored in memory (such as a buffer) of the base station from consuming a large amount of memory resources, the base station may use an RLC AM transmission window for transmission of RLC packets. The RLC AM transmission window may dictate which RLC packets are stored in memory of the base station for potential retransmission after an initial transmission. In the example of FIG. 5, the base station transmits RLC packets having sequence numbers 0 through 5 and maintains those RLC packets in memory until the RLC AM transmission window is adjusted, such as due to reception of an RLC status report indicating that one or more oldest RLC packets (for example, having the lowest sequence numbers in the window) have been received by all UEs (or a threshold number of UEs) subscribed to receive the RLC packets. After transmission of RLC packet 5, the base station transmits a polling request to trigger the UEs subscribed to receive the RLC packets (shown as UE1, UE2, and UE3) to transmit an RLC status report.

In a second operation 510, the UEs may transmit respective RLC status reports indicating, for example, a negative acknowledgment (NACK) for RLC packets that were not successfully received. As shown in FIG. 5, UE1 indicates that RLC packets 1 and 3 were not successfully received by UE1 (shown as NACK_SN=1,3). As further shown, UE2 indicates that RLC packets 1 and 4 were not successfully received by UE2 (shown as NACK_SN=1,4). As further shown, UE3 indicates that RLC packet 1 was not successfully received by UE3 (shown as NACK_SN=1). As further shown, UE1, UE2, and UE3 may also indicate, respectively, that UE1, UE2, and UE3 can now receive RLC packet 6 (shown as ACK_SN=6) because RLC packet 0 was successfully received by each UE and an RLC AM reception window of each UE has been adjusted (for example, to include RLC packets 1 through 6).

When a UE fails to receive an RLC packet or a segment of an RLC packet, the UE may start a reassembly timer. If the reassembly timer expires before the UE receives the RLC packet or the segment of the RLC packet, then the UE may skip the RLC packet and may indicate, to the base station, that the RLC packet has been skipped.

The RLC AM reception window may be associated with receiving retransmissions of RLC packets or may be associated with reassembly of RLC packets (such as for a multicast/broadcast service). For example, if a UE receives an RLC packet with a sequence number (SN) that matches an SN in the RLC AM reception window, then the UE may deliver the RLC packet to an upper layer (or may store the RLC packet for later delivery to the upper layer, such as in the example of in-sequence RLC packet delivery). If the UE receives an RLC packet with an SN that does not match any SNs in the RLC AM reception window, then the UE may discard the RLC packet.

As further shown, the UEs may deliver successfully received RLC packets to an upper layer, such as a PDCP layer. For example, UE1 may deliver packets 0, 2, 4, and 5 to an upper layer of UE1, UE2 may deliver packets 0, 2, 3, and 5 to an upper layer of UE2, and UE3 may deliver packets 0, 2, 3, 4, and 5 to an upper layer of UE3. In this example, the UEs may use out-of-sequence RLC packet delivery.

In a third operation 515, the base station receives the RLC status reports and adjusts the RLC AM transmission window based at least in part on the RLC status reports. In this example, the base station determines that all of the UEs have received RLC packet 0, and thus the base station can discard or delete RLC packet 0 from memory because the base station will not need to retransmit RLC packet 0. However, the base station must keep RLC packet 1 stored in memory because at least one of the UEs did not receive RLC packet 1 (in this example, none of the UEs received RLC packet 1). Due to the maximum RLC AM transmission window size of 6 RLC packets in this example, the base station adjusts the RLC AM transmission window to include RLC packets 1 through 6. Based at least in part on the RLC status reports, the base station retransmits RLC packets 1, 3, and 4 (using either unicast retransmission or multicast/broadcast retransmission), and also transmits RLC packet 6 (using multicast/broadcast transmission). After transmission of RLC packet 6, the base station transmits a polling request to trigger UE1, UE2, and UE3 to transmit an RLC status report.

In some aspects, the base station may use multicast/broadcast transmission for an initial transmission of an RLC packet (for example, via an MRB), and may use either multicast/broadcast transmission (for example, via the MRB) or unicast transmission (for example, via the MRB or a dedicated radio bearer (DRB)) for a retransmission of the RLC packet.

In a fourth operation 520, the UEs may transmit respective RLC status reports indicating, for example, a NACK for RLC packets that were not successfully received. As shown in FIG. 5, UE1 may successfully receive RLC packet 6, but may fail to receive RLC packets 1 and 3, and thus may indicate that RLC packets 1 and 3 were not successfully received by UE1. As further shown, UE2 may successfully receive RLC packets 1 and 4, but may fail to receive RLC packet 6, and thus may indicate that RLC packet 6 was not successfully received by UE2. As further shown, UE3 may successfully receive RLC packets 1 and 6, and thus may indicate that all RLC packets were successfully received by UE3. The UEs may deliver successfully received RLC packets to an upper layer, such as a PDCP layer, as described above.

In such examples, UE2 has successfully received RLC packets 1 through 5 and UE3 has successfully received RLC packets 1 through 6. However, because UE1 has not received RLC packet 1, the base station cannot adjust the RLC AM transmission window due to the window size of six because the base station needs to continue to store RLC packet 1 in memory until, for example, RLC packet 1 is successfully received by UE1 (or until UE1 indicates a failure to receive RLC packet 1 due to expiration of a reassembly timer). The inability to adjust the RLC AM transmission window results in increased latency for UE2 and UE3 as a result of, for example, poor channel conditions between the base station and the UE1.

Some techniques and apparatuses described herein enable the base station to adjust an RLC AM transmission window despite one or more UEs not having received an RLC packet at the start of the RLC AM transmission window (for example, an RLC packet with the lowest sequence number in the window) or despite not receiving an indication from all UEs, subscribed to receive the RLC packets, that the RLC AM transmission window can be adjusted. Furthermore, these techniques and apparatuses may enable the base station to indicate the RLC AM transmission window adjustment to the UEs, thereby enabling the UEs to adjust a corresponding RLC AM reception window so that the RLC AM reception window and the RLC AM transmission window are synchronized. This may enable proper reception of RLC packets and may reduce latency.

Figure 6:
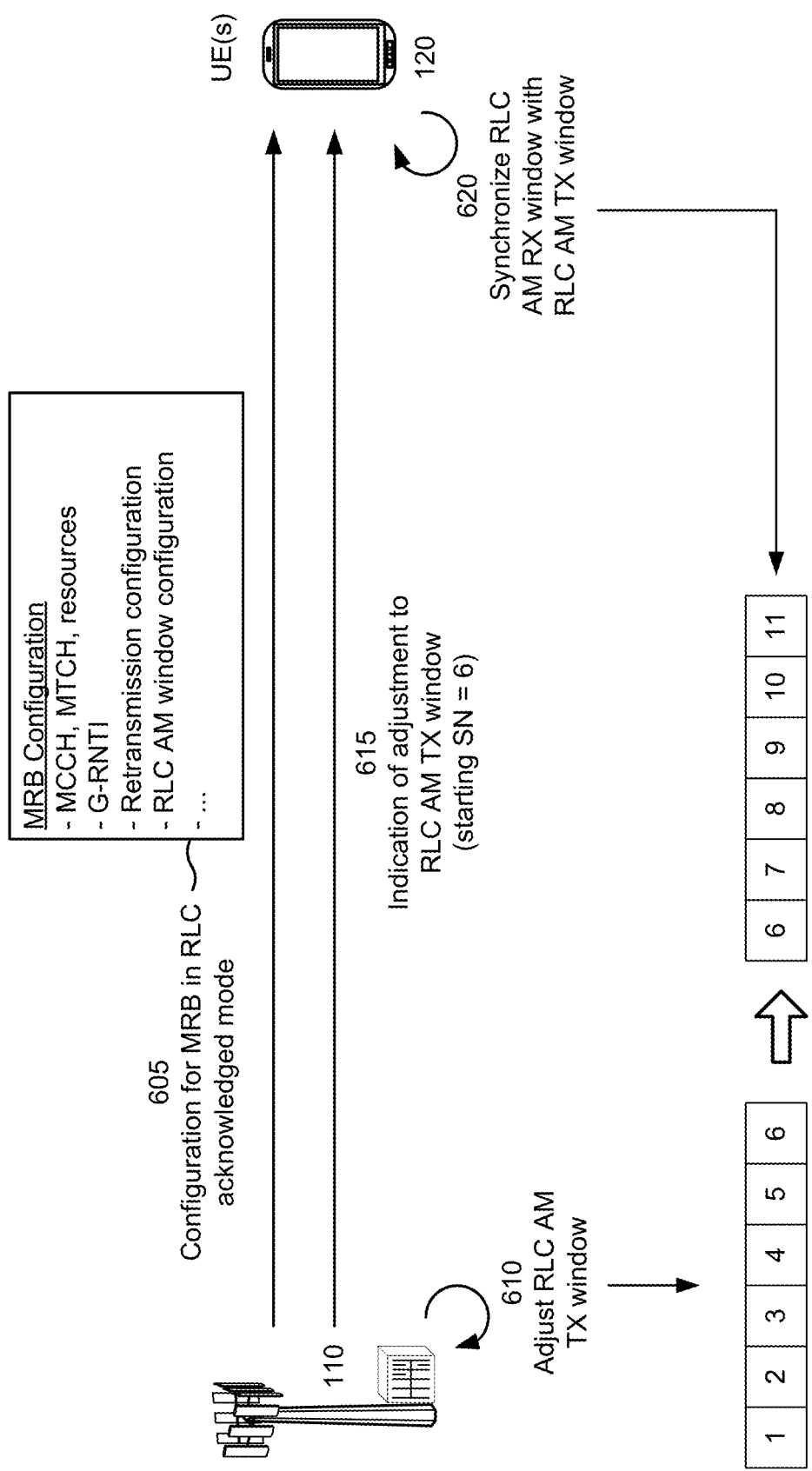
FIG. 6 is a diagram illustrating an example of operating in an RLC acknowledged mode using a multicast or broadcast radio bearer (MRB) in accordance with various aspects of the present disclosure.

FIG. 6 is a diagram illustrating an example of operating in an RLC acknowledged mode using a multicast or broadcast radio bearer (MRB) in accordance with various aspects of the present disclosure. As shown in FIG. 6, a UE 120 and a base station 110 may communicate with one another.

In a first operation 605, the base station 110 may transmit, to the UE 120, a configuration for an MRB for RLC AM. In RLC AM, reliable transmission of multicast/broadcast traffic may be supported using acknowledgment (ACK) or negative acknowledgement (NACK) feedback and retransmissions. In some aspects, the ACK or NACK (sometimes referred to as ACK/NACK) feedback may be transmitted by the UE 120 in an RLC status report. In some aspects, the base station 110 may transmit the configuration for the MRB in a configuration message, such as an RRC message (for example, an RRC configuration message or an RRC reconfiguration message, among other examples). The base station 110 and the UE 120 may establish an MRB based at least in part on the MRB configuration. Although shown as configuring a single UE 120 with an MRB, the base station 110 may configure an MRB for each UE 120 (for example, a set of UEs 120) subscribed to a multicast/broadcast service.

As shown, the MRB configuration may indicate a multicast/broadcast control channel (MCCH) for transmission of multicast/broadcast control messages. Additionally or alternatively, the MRB configuration may indicate a multicast/ broadcast traffic channel (MTCH) for transmission of multicast/broadcast data. For example, the MRB configuration may indicate resources (such as time domain resources, frequency domain resources, or spatial domain resources, among other examples) allocated to the MCCH and the MTCH. Additionally or alternatively, the MRB configuration may indicate a group radio network temporary identifier (G-RNTI) associated with the MRB. The G-RNTI may be used to transmit (such as by scrambling) communications on the MRB and to receive (such as by descrambling) communications on the MRB. In some aspects, different multicast/ broadcast subscriptions may be associated with different G-RNTIs.

Additionally or alternatively, the MRB configuration may indicate a retransmission configuration for multicast/broadcast traffic transmitted via the MRB. For example, the MRB configuration may indicate whether retransmissions are unicast retransmissions (which may use a cell radio network temporary identifier (C-RNTI) in a similar manner as a G-RNTI), multicast/broadcast retransmissions (which may use a G-RNTI, as described above), or capable of being switched between unicast and multicast/broadcast. In some aspects, the retransmission configuration may indicate one or more resources to be used for retransmissions (for example, for preconfigured retransmissions).

In some aspects, the MRB configuration may include an RLC AM window configuration for the MRB (or for all MRBs). For example, the RLC AM window configuration may indicate a size of an RLC AM transmission window, a size of an RLC AM reception window, a maximum size of an RLC AM transmission window, a maximum size of an RLC AM reception window, a reassembly timer duration, a duration for a timer associated with adjusting the RLC AM transmission window, a duration for a timer associated with adjusting the RLC AM reception window, an indication of whether RLC AM window adjustment indications are enabled or disabled, an indication of an RLC status PDU that includes an RLC window adjustment indication, an indication of a periodicity for transmission of RLC window adjustment indications, an indication of one or more resources in which RLC window adjustment indications are to be transmitted, or a combination thereof, among other examples. In some aspects, the maximum size of the RLC AM reception window for multicast/broadcast transmissions (such as for an MRB) may be configured with a smaller size than an RLC reception window used for unicast transmissions. This may conserve memory resources of the UE 120 (such as L2 memory resources, which may be limited for a UE 120), particularly when the UE 120 is subscribed to multiple multicast/broadcast services or is configured with multiple MRBs.

In a second operation 610, the base station 110 may determine an adjustment of an RLC AM transmission window of the base station. In some aspects, the base station 110 may adjust the RLC AM transmission (shown as TX) window despite one or more UEs 120 not having received an RLC packet at the start of the RLC AM transmission window (for example, an RLC packet with the lowest sequence number in the window). Additionally or alternatively, the base station 110 may adjust the RLC AM transmission window despite not receiving an indication from all UEs 120, subscribed to receive the RLC packets, that the RLC AM transmission window can be adjusted (such as due to expiration of a reassembly timer at a UE 120). For example, the base station 110 may adjust the RLC AM transmission window even if all RLC status reports, from UEs 120 subscribed to receive the RLC packets, do not indicate that the base station 110 can adjust the RLC AM transmission window.

Referring back to the example of FIG. 5, the base station 110 may adjust the RLC AM transmission window from RLC packets 1 through 6 to RLC packets 6 through 11 despite UE1 having reported a NACK for RLC packets 1 and 3. Because UE2 has successfully received RLC packets 1 through 5 and UE3 has successfully received RLC packets 1 through 6, adjusting the RLC AM transmission window may reduce latency for UE2 and UE3.

In some aspects, the base station 110 may determine to adjust the RLC AM transmission window based at least in part on expiration of a timer, such as an RLC AM transmission window adjustment timer. As an example, the base station 110 may start the RLC AM transmission window adjustment timer when an RLC AM transmission window is adjusted. When the RLC AM transmission window adjustment timer expires, the base station 110 may adjust the RLC AM transmission window. In some aspects, an offset for adjusting the RLC AM transmission window upon expiration of the RLC AM transmission window adjustment timer may be configured by the base station 110 (such as in the MRB configuration described above) or may be prespecified in a wireless communication standard, among other examples. In some aspects, the offset may be configured to move the entire window so that the current start of the RLC AM transmission window is one SN after the previous end of the RLC AM transmission window. In some aspects, a duration of the RLC AM transmission window may be applied across all MRBs or may be MRB-specific.

Additionally or alternatively, the base station 110 may determine to adjust the RLC AM transmission window based at least in part on expiration of a timer associated with receiving NACK feedback from the UE 120 (or a set of UEs 120), such as a NACK feedback timer. In some aspects, the base station 110 may start the NACK feedback timer upon transmission of an RLC packet. If the base station 110 does not receive a NACK for the RLC packet prior (for example, in one or more RLC status reports) to expiration of the NACK feedback timer, then the base station 110 may assume that the RLC packet was successfully received by the UE 120 (or the set of UEs 120). The base station 110 may treat the RLC packet as successfully received for purposes of adjusting the RLC AM transmission window, and may adjust the RLC AM transmission window accordingly. In some aspects, the base station 110 may indicate the RLC AM transmission window adjustment to the UE 120, as described below.

Additionally or alternatively, the base station 110 may determine to adjust the RLC AM transmission window based at least in part on a failure indication from a medium access control (MAC) layer. For example, the base station 110 may determine to adjust the RLC AM transmission window based at least in part on a hybrid automatic repeat request (HARQ) failure indication from the MAC layer. Additionally or alternatively, the base station 110 may determine to adjust the RLC AM transmission window based at least in part on transmitting a threshold number of retransmissions.

In a third operation 615, the base station 110 may transmit an indication of the adjustment of the RLC AM transmission window (sometimes referred to as an RLC AM window adjustment indication) to the UE 120 (for example, to all UEs 120 subscribed to receive the RLC packets of the multicast/broadcast service). As shown, the indication of the adjustment of the RLC AM transmission window may indicate an SN of a start of the RLC AM transmission window (for example, a lowest sequence number in the window). In this example, the SN is 6. In some aspects, the base station 110 may indicate the adjustment of the RLC AM transmission window using another value, such as an SN at the end of the RLC AM transmission window, an offset that represents the difference from a previous start of the RLC AM transmission window (prior to the adjustment) to a current start of the RLC AM transmission window (after the adjustment), or an offset that represents the difference from a previous end of the RLC AM transmission window (prior to the adjustment) to a current end of the RLC AM transmission window (after the adjustment), among other examples. The base station may transmit the RLC AM window adjustment indication in a status control PDU (such as an RLC status control PDU) or another RLC control PDU, among other examples.

In some aspects, the base station 110 may periodically transmit an RLC AM window adjustment indication. In such examples, the base station 110 may indicate a periodicity for RLC AM window adjustment indications or one or more resources (time resources, frequency resources, or spatial resources, among other examples) for transmission of RLC AM window adjustment indications, among other examples. For example, the base station 110 may indicate the periodicity or the one or more resources in a configuration, such as the MRB configuration described above.

Additionally or alternatively, the base station 110 may transmit an RLC AM window adjustment indication based at least in part on a number of retransmissions of RLC AM packets. For example, if the base station 110 transmits or retransmits an RLC packet a threshold number of times (such as two times, three times, or four times, among other examples), then the base station 110 may adjust the RLC AM transmission window to exclude that RLC packet, and may indicate the RLC AM window adjustment to the UE 120. In this way, latency caused by the failed reception of the RLC packet by one or more UEs 120 may be reduced.

In a fourth operation 620, the UE 120 may synchronize an RLC AM reception (shown as RX) window of the UE 120 with the RLC AM transmission window. For example, the UE 120 may synchronize the RLC AM reception window by adjusting the RLC AM reception window to include the same set of RLC sequence numbers (corresponding to the same set of RLC packets) as the RLC AM transmission window. For example, if the base station 110 indicates a starting SN for the RLC AM transmission window, then the UE 120 may adjust the RLC AM reception window to start at the SN indicated by the base station 110.

The example of FIG. 6 shows the UE 120 determining the adjustment of the RLC AM transmission window made by the base station 110 and determining to adjust the RLC AM reception window of the UE 120 based at least in part on an indication from the base station 110. However, in some aspects, the UE 120 may determine the adjustment of the RLC AM transmission window made by the base station 110 or may determine to adjust the RLC AM reception window of the UE 120 without receiving an indication from the base station 110. For example, the UE 120 may determine the adjustment(s) based at least in part on expiration of a timer, such as an RLC AM reception window adjustment timer. As an example, the UE 120 may start the RLC AM reception window adjustment timer when an RLC AM reception window is adjusted. When the RLC AM reception window adjustment timer expires, the UE 120 may adjust the RLC AM reception window. In some aspects, an offset for adjusting the RLC AM reception window upon expiration of the RLC AM reception window adjustment timer may be configured by the base station 110 (such as in the MRB configuration described above) or may be prespecified in a wireless communication standard, among other examples. In some aspects, the offset may be configured to move the entire window so that the current start of the RLC AM reception window is one SN after the previous end of the RLC AM reception window. In some aspects, a duration of the RLC AM reception window adjustment timer may be configured by the base station 110, such as in the MRB configuration described above. The duration may be applied across all MRBs or may be MRB-specific. In some aspects, the duration of the RLC AM reception window adjustment timer may be the same as a duration of an RLC AM transmission window adjustment timer, described above.

In some aspects, the base station 110 may use multicast/broadcast transmission for an initial transmission of an RLC packet (for example, via an MRB), and may use either multicast/broadcast transmission (for example, via the MRB) or unicast transmission (for example, via the MRB or a dedicated radio bearer (DRB)) for a retransmission of the RLC packet. In some aspects, the base station 110 may determine whether to transmit the retransmission of the RLC packet as the multicast/broadcast (M/B) transmission (such as by using a configured G-RNTI) or the unicast transmission (such as by using a configured C-RNTI) based at least in part on a quantity of UEs indicating a NACK in RLC status reports, a quantity of NACKs in the RLC status reports, a quantity of RLC status reports that include a NACK, or a combination thereof, among other examples. For example, if one or more of the above quantities satisfy a threshold (or multiple thresholds corresponding to multiple quantities), then the base station may use M/B transmission for the retransmission. If one or more of the above quantities do not satisfy a threshold (or multiple thresholds corresponding to multiple quantities), then the base station may use unicast transmission for the retransmission.

By adjusting, indicating, and synchronizing an RLC AM window as described herein, the base station 110 and the UE 120 may enable proper reception of RLC packets and may reduce latency.

Figure 7:
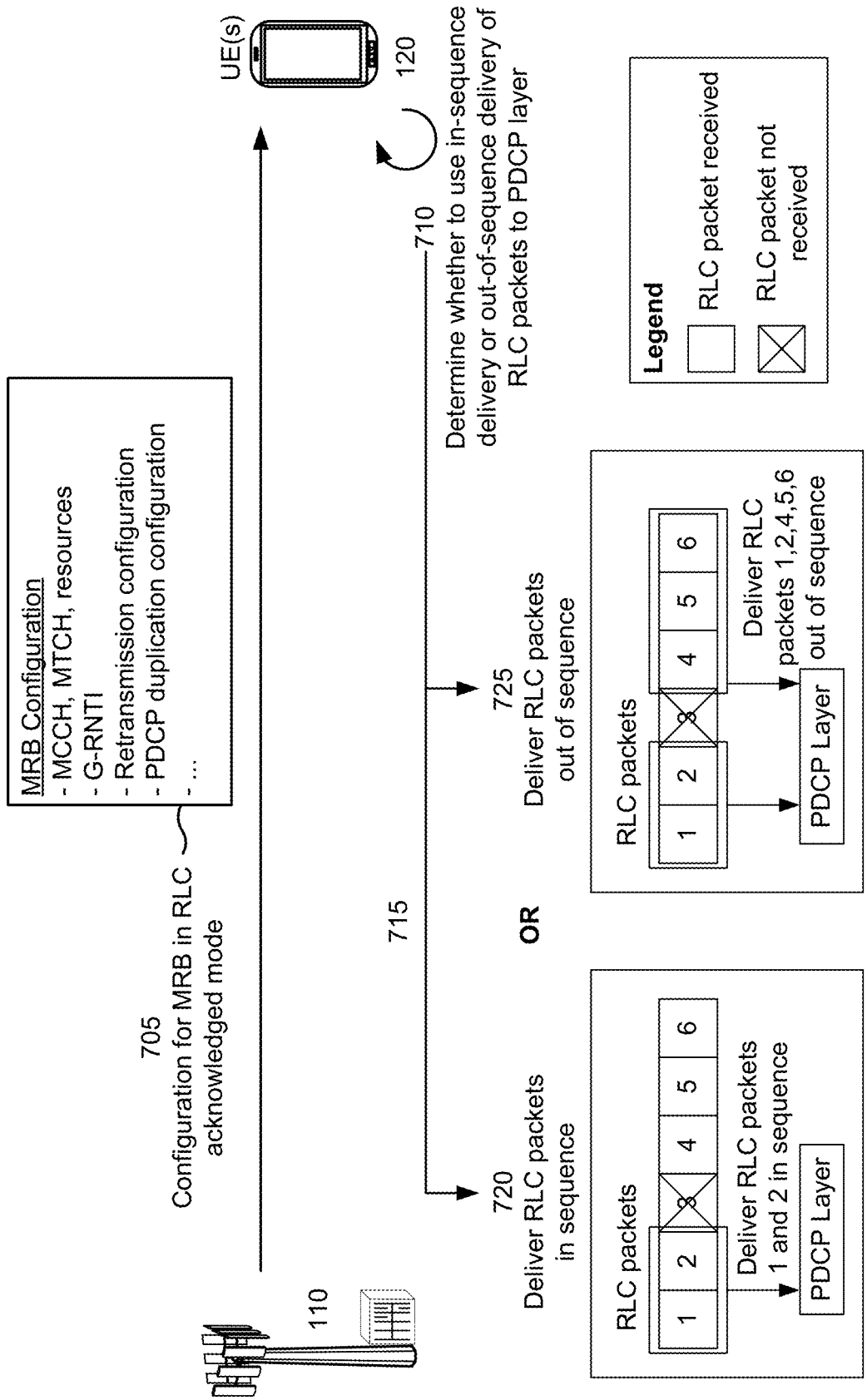
FIG. 7 is a diagram illustrating an example of operating in an RLC acknowledged mode using an MRB in accordance with various aspects of the present disclosure.

FIG. 7 is a diagram illustrating an example of operating in an RLC acknowledged mode using an MRB in accordance with various aspects of the present disclosure. As shown in FIG. 7, a UE 120 and a base station 110 may communicate with one another.

In a first operation 705, the base station 110 may transmit, to the UE 120, a configuration for an MRB for RLC AM, as described above in connection with FIG. 6. In some aspects, the configuration may indicate a PDCP duplication configuration. The PDCP duplication configuration may indicate, for example, whether PDCP duplication is enabled or disabled. If PDCP duplication is enabled, then the base station 110 may transmit multiple (duplicate) copies of PDCP packets to the UE 120. The PDCP packets may be encapsulated in RLC packets. In some aspects, different copies of the same PDCP packet may be transmitted via different RLC entities (for example, transmission via different radio bearers or transmission via different radio access technologies (RATs) such as NR and LTE in a dual connectivity mode, among other examples). If PDCP duplication is disabled, then the base station 110 may transmit a single copy of each PDCP packet to the UE 120 (with potentially multiple RLC packets carrying the same PDCP packet in the example of an RLC retransmission).

In a second operation 710, the UE 120 may determine whether to use in-sequence delivery or out-of-sequence delivery to deliver RLC packets to a PDCP layer of the UE 120. For out-of-sequence delivery, the UE 120 may deliver RLC packets to the PDCP layer as the RLC packets are received, regardless of whether all prior RLC packets (for example, all prior RLC packets in the current RLC AM reception window) have been received. For in-sequence delivery, the UE 120 may deliver an RLC packet to the PDCP layer only if all prior RLC packets (for example, in the current RLC AM reception window) have been received and delivered to the PDCP layer. Thus, for in-sequence delivery, the UE 120 may deliver RLC packets to the PDCP layer in an order indicated by RLC sequence numbers, whereas for out-of-sequence delivery, the UE 120 may deliver RLC packets to the PDCP layer in any order.

In some aspects, the UE 120 may determine whether to use in-sequence delivery or out-of-sequence delivery based at least in part on the MRB configuration. For example, the UE 120 may determine whether to use in-sequence delivery or out-of-sequence delivery to deliver RLC packets to the PDCP layer based at least in part on whether PDCP duplication (for example, downlink PDCP duplication) is configured for the MRB. For example, the UE 120 may use out-of-sequence delivery if PDCP duplication is configured for the MRB. As another example, the UE 120 may use in-sequence delivery if PDCP duplication is not configured for the MRB. Additionally or alternatively, the UE 120 may determine whether to use in-sequence delivery or out-of-sequence delivery based at least in part on an RLC configuration if PDCP duplication is not configured for the MRB. In some aspects, the RLC configuration may be included in the MRB configuration described above. The RLC configuration may indicate whether to use in-sequence or out-of-sequence delivery of RLC packets to an upper layer (such as the PDCP layer).

With PDCP duplication, multiple RLC packets may carry the same PDCP packet (or the same segment of a PDCP packet), such as a PDCP packet that has the same sequence number. Because RLC packets transmitted on different RLC entities may not use corresponding RLC sequence numbers, using in-sequence delivery with PDCP duplication may result in delays in adjusting a PDCP reception window (which operates in a similar manner as the RLC AM reception window described herein, except for PDCP packets instead of RLC packets). Furthermore, if a PDCP reordering timer (similar to the RLC reassembly timer described herein) expires for a PDCP packet while the UE 120 is waiting for delivery of the PDCP packet (via an RLC packet) to the PDCP layer, then the UE 120 may adjust the PDCP reception window before receiving the PDCP packet at the PDCP layer, and may discard the PDCP packet if the PDCP packet is later received at the PDCP layer. This adjustment may occur even if the PDCP packet has been received by the UE 120 but is contained within an RLC packet that is being held in a buffer due to an in-sequence delivery requirement. Thus, by enabling out-of-sequence delivery, PDCP packets may be processed earlier and fewer PDCP packet discards may occur, particularly when PDCP duplication is enabled and PDCP packets are more likely to be received out of sequence. When PDCP duplication is disabled, out-of-sequence reception of PDCP packets occurs less frequently, and so the UE 120 may use in-sequence delivery of RLC packets to the PDCP layer in such examples.

In a third operation 715, the UE 120 may deliver RLC packets to the PDCP layer in sequence (according to a sequence number) or out of sequence (regardless of sequence numbers) based at least in part on determining whether to use in-sequence delivery or out-of-sequence delivery to deliver RLC packets to the PDCP layer. For example, if the UE 120 determines to use in-sequence delivery, then the UE 120 may deliver RLC packets to the PDCP layer in sequence. As another example, if the UE 120 determines to use out-of-sequence delivery, then the UE 120 may deliver RLC packets to the PDCP layer out of sequence.

As an example of in-sequence delivery, and as shown in operation 720, an RLC AM reception window may include RLC sequence numbers 1 through 6. The UE 120 may receive RLC packets 1, 2, 4, 5, and 6, and may fail to receive RLC packet 3. Using in-sequence delivery, the UE 120 may deliver RLC packets 1 and 2 to the PDCP layer in order (such as by delivering RLC packet 1 first and delivering RLC packet 2 second). The UE 120 may store RLC packets 4, 5, and 6 in an RLC buffer and may refrain from delivering RLC packets 4, 5, and 6 to the PDCP layer until RLC packet 3 is received. Upon reception of RLC packet 3, the UE 120 may deliver RLC packets 3, 4, 5, and 6 to the PDCP layer in order.

As an example of out-of-sequence delivery, and as shown in operation 725, an RLC AM reception window may include RLC sequence numbers 1 through 6. The UE 120 may receive RLC packets 1, 2, 4, 5, and 6, and may fail to receive RLC packet 3. Using out-of-sequence delivery, the UE 120 may deliver all received RLC packets 1, 2, 4, 5, and 6 to the PDCP layer. Upon reception of RLC packet 3, the UE 120 may deliver RLC packet 3 to the PDCP layer.

Thus, some techniques and apparatuses described herein enable flexible configuration of in-sequence delivery or out-of-sequence delivery of RLC packets to an upper layer (such as a PDCP layer). By enabling or configuring out-of-sequence delivery, PDCP packets may be processed earlier and fewer PDCP packet discards may occur, particularly when PDCP duplication is enabled and PDCP packets are more likely to be received out of sequence. When PDCP duplication is disabled, out-of-sequence reception of PDCP packets occurs less frequently, and so the UE 120 may use in-sequence delivery of RLC packets to the PDCP layer in such examples.

Figure 8:
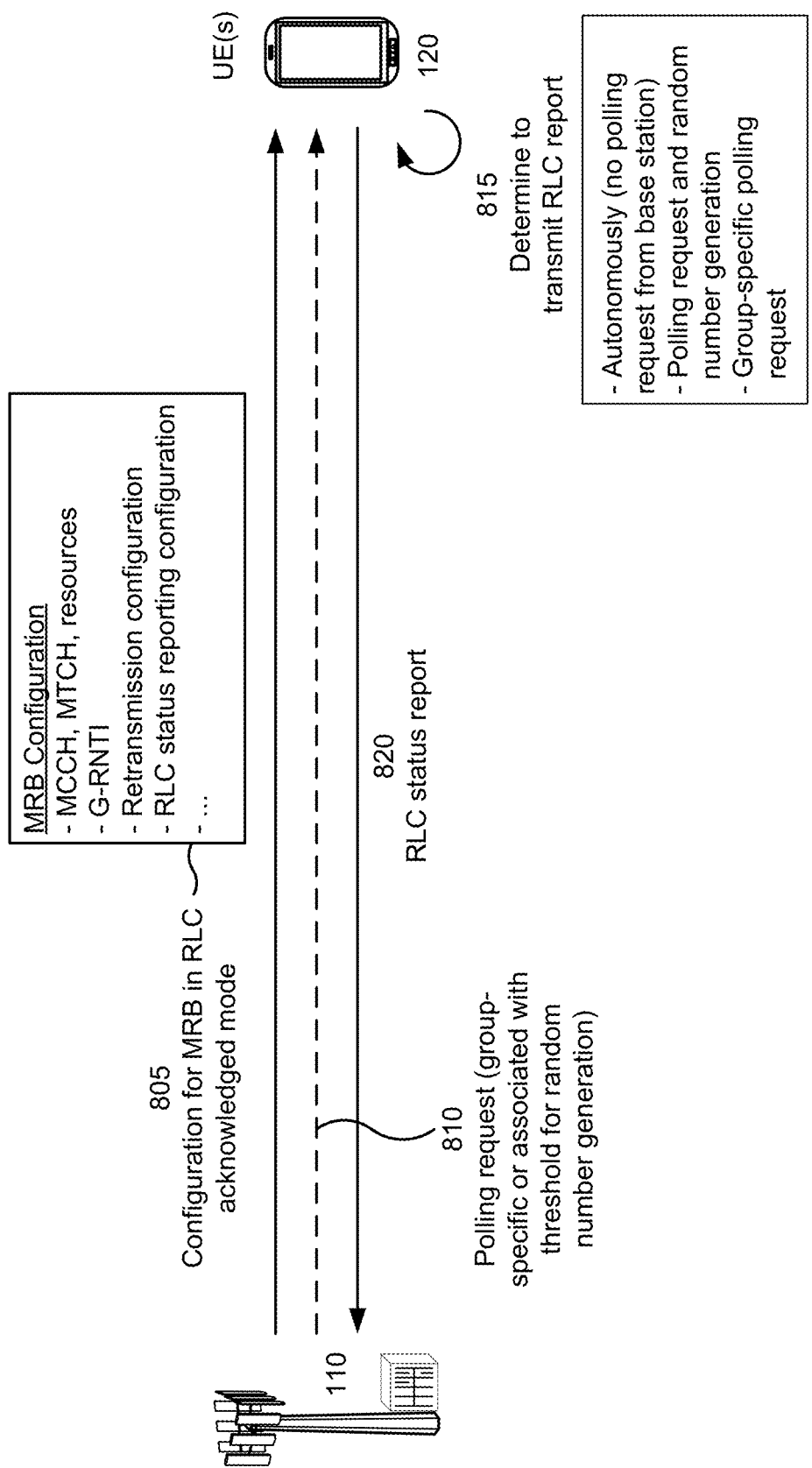
FIG. 8 is a diagram illustrating an example of operating in an RLC acknowledged mode using an MRB in accordance with various aspects of the present disclosure.

FIG. 8 is a diagram illustrating an example of operating in an RLC acknowledged mode using an MRB in accordance with various aspects of the present disclosure. As shown in FIG. 8, a UE 120 and a base station 110 may communicate with one another.

In a first operation 805, the base station 110 may transmit, to the UE 120, a configuration for an MRB for RLC AM, as described above in connection with FIG. 6. In some aspects, the configuration may indicate an RLC status reporting configuration. The RLC status reporting configuration may indicate, for example, a trigger for RLC status reporting, such as a UE-detected trigger to be used for RLC status reporting, an RLC status reporting timer to be used for RLC status reporting, a duration of the RLC status reporting timer, a condition that triggers the UE 120 to transmit an RLC status report, a threshold associated with triggering an RLC status report with random number generation, an identifier to be used for group-specific RLC status reporting, or a combination thereof, among other examples. Additional details about these parameters are described below.

In a second operation 810, the base station 110 may transmit a polling request to the UE 120. A dashed line is used in FIG. 8 to indicate that in some aspects, the base station 110 may not transmit a polling request to trigger the UE 120 to transmit an RLC status report. However, in some aspects, the base station 110 may transmit the polling request. In some aspects, the polling request may be associated with a threshold value (which may be indicated in the MRB configuration described above) associated with the polling request. The threshold value may control whether the UE 120 transmits an RLC status report in response to the polling request. For example, upon receiving the polling request, the UE 120 may generate a random number. If the random number satisfies a condition (for example, is greater than the threshold, is less than the threshold, is equal to the threshold, or a combination thereof, among other examples), then the UE 120 may transmit the RLC status report in response to the polling request. If the random number does not satisfy the condition, then the UE 120 may refrain from transmitting an RLC status report in response to the polling request. In this way, a network load and signaling overhead of RLC status reports may be reduced.

As another example, the polling request may be a group-specific polling request. The group-specific polling request may trigger fewer than all UEs, subscribed to receive the RLC packets, to transmit a response to the polling request. For example, the polling request may be associated with a value (for example, included in the polling request) that controls whether the UE 120 transmits an RLC status report in response to the polling request. For example, upon receiving the polling request, the UE 120 may compare the value to at least a portion of an identifier (for example, a portion of the identifier, one or more bits of the identifier, one or more least significant bits of the identifier, one or more most significant bits of the identifier, or the entire identifier, among other examples) associated with the UE 120. The identifier may include, for example, a subscription permanent identifier (SUPI), an international mobile subscriber identity (IMSI), a C-RNTI, a G-RNTI, or a combination thereof, among other examples. In some aspects, the identifier to be used for RLC status reporting may be indicated in a configuration, such as the MRB configuration described above.

In a third operation 815, the UE 120 may determine to transmit an RLC status report. In some aspects, the UE 120 may determine to transmit the RLC status report based at least in part on receiving a polling request, generating a random number, and determining that the random number satisfies a condition, as described above. Additionally or alternatively, the UE 120 may determine to transmit the RLC status report based at least in part on receiving a group-specific polling request for a group to which the UE 120 belongs (which may be determined based at least in part on an identifier associated with the UE 120), as described above. In both of these examples, the UE 120 may receive a polling request from the base station 110, and may determine whether to transmit an RLC status report based at least in part on receiving the polling request and performing an additional operation (such as a comparison, random number generation, or a combination thereof, among other examples).

However, in some aspects, the UE 120 may autonomously determine to transmit an RLC status report without receiving a polling request from the base station 110. For example, the UE 120 may determine to transmit an RLC status report based at least in part on expiration of a timer, such as an RLC status reporting timer. In some aspects, the RLC status reporting timer may start when the UE 120 transmits an RLC status report. Thus, the UE 120 may periodically transmit RLC status reports. In some aspects, the duration of the RLC status reporting timer or the periodicity of RLC status reporting may be configured by the base station 110, such as in the MRB configuration described above.

As another example of autonomous UE determination to transmit an RLC status report, the UE 120 may determine to transmit an RLC status report based at least in part on determining that a quantity of unreceived RLC packets or a quantity of unreceived bytes (of RLC packets) satisfies a threshold. For example, the UE 120 may transmit an RLC status report if the UE 120 fails to receive a threshold number of RLC packets (such as a threshold number of RLC packets in a current RLC AM reception window) or a threshold number of other PDUs (such as PDCP packets, among other examples). Additionally or alternatively, the UE 120 may transmit an RLC status report if the UE 120 fails to receive a threshold number of bytes of RLC packets. In some aspects, the UE 120 may determine a number of unreceived bytes based at least in part on information carried in received RLC packets, such as a byte counter in a header of an RLC packet. In some aspects, the threshold number of RLC packets or the threshold number of bytes may be configured by the base station 110, such as in the MRB configuration described above.

As another example of autonomous UE determination to transmit an RLC status report, the UE 120 may determine to transmit an RLC status report based at least in part on receiving an RLC packet with a sequence number having a threshold offset from a sequence number of an unreceived RLC packet. For example, the UE 120 may receive an RLC packet having sequence number N, and may determine that the UE 120 has failed to receive an RLC packet having a sequence number N−k, where k is a threshold offset. Based at least in part on determining that the UE 120 has not received an RLC packet with a sequence number (N−k) that is less than the sequence number of a received RLC packet (N) by the threshold offset (k), the UE 120 may transmit an RLC status report. In some aspects, the threshold offset may be configured by the base station 110, such as in the MRB configuration described above.

In a fourth operation 820, the UE 120 may transmit an RLC status report to the base station 110. For example, the UE 120 may transmit the RLC status report based at least in part on determining to transmit the RLC status report using one or more techniques described herein in connection with FIG. 8. By using one or more of these techniques, a network load and signaling overhead associated with transmission of RLC status reports may be reduced.

Figure 9:
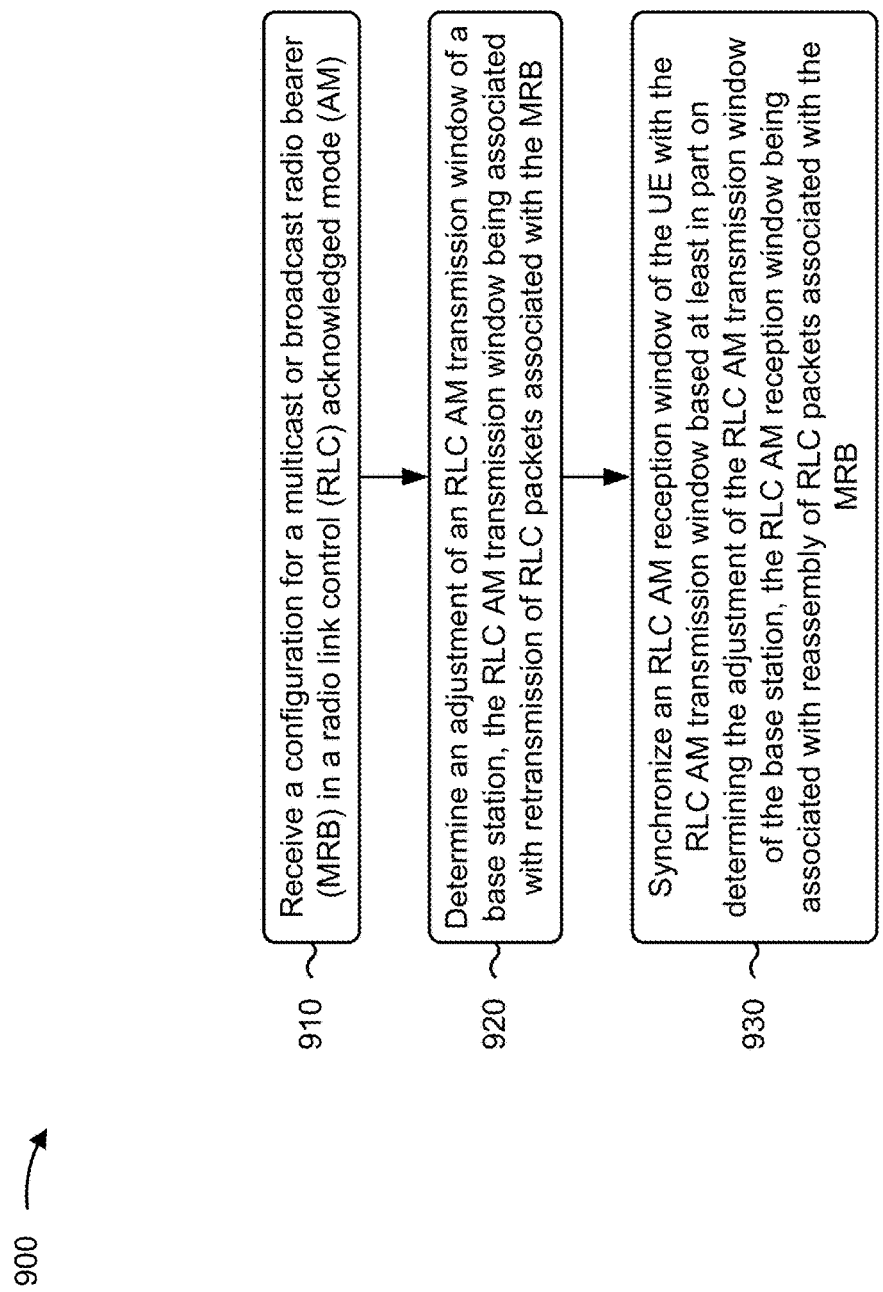
FIG. 9 is a flowchart illustrating an example process performed by a UE in accordance with various aspects of the present disclosure.

FIG. 9 is a diagram illustrating an example process performed, for example, by a UE, in accordance with various aspects of the present disclosure. The example process is an example where the UE (for example, UE 120) performs operations associated with operating in an RLC AM using an MRB.

As shown in FIG. 9, in some aspects, the process may include receiving a configuration for an MRB in an RLC AM (block 910). For example, the UE (for example, using receive processor 258, controller/processor 280, or memory 282, among other examples) may receive a configuration for an MRB in an RLC AM, as described above.

As further shown in FIG. 9, in some aspects, the process may include determining an adjustment of an RLC AM transmission window of a base station, the RLC AM transmission window being associated with retransmission of RLC packets associated with the MRB (block 920). For example, the UE (for example, using receive processor 258, transmit processor 264, controller/processor 280, or memory 282, among other examples) may determine an adjustment of an RLC AM transmission window of a base station, the RLC AM transmission window being associated with retransmission of RLC packets associated with the MRB, as described above.

As further shown in FIG. 9, in some aspects, the process may include synchronizing an RLC AM reception window of the UE with the RLC AM transmission window based at least in part on determining the adjustment of the RLC AM transmission window of the base station, the RLC AM reception window being associated with reassembly of RLC packets associated with the MRB (block 930). For example, the UE (for example, using receive processor 258, transmit processor 264, controller/processor 280, or memory 282, among other examples) may synchronize an RLC AM reception window of the UE with the RLC AM transmission window based at least in part on determining the adjustment of the RLC AM transmission window of the base station, as described above. In some aspects, the RLC AM reception window is associated with reassembly of RLC packets associated with the MRB.

The process may include additional aspects, such as any single aspect or any combination of aspects described below or in connection with one or more other processes described elsewhere herein.

In a first aspect, determining the adjustment of the RLC AM transmission window comprises determining the adjustment based at least in part on expiration of a timer.

In a second aspect, alone or in combination with the first aspect, determining the adjustment of the RLC AM transmission window comprises receiving an indication of the adjustment of the RLC AM transmission window.

In a third aspect, alone or in combination with one or more of the first and second aspects, the indication of the adjustment of the RLC AM transmission window is received in a status control protocol data unit or another RLC control protocol data unit.

In a fourth aspect, alone or in combination with one or more of the first through third aspects, the indication of the adjustment of the RLC AM transmission window indicates a sequence number of a start of the RLC AM transmission window.

In a fifth aspect, alone or in combination with one or more of the first through fourth aspects, the indication of the adjustment of the RLC AM transmission window is received periodically or based at least in part on a number of retransmissions of RLC packets by the base station.

In a sixth aspect, alone or in combination with one or more of the first through fifth aspects, the configuration for the MRB indicates a maximum window size of the RLC AM reception window for the MRB.

In a seventh aspect, alone or in combination with one or more of the first through sixth aspects, the process includes receiving an initial transmission as an M/B transmission via the MRB and receiving a retransmission as either an M/B transmission or a unicast transmission via one of the MRB or a dedicated radio bearer.

Although FIG. 9 shows example blocks of the process, in some aspects, the process may include additional blocks, fewer blocks, different blocks, or differently arranged blocks than those depicted in FIG. 9. Additionally or alternatively, two or more of the blocks of the process may be performed in parallel.

Figure 10:
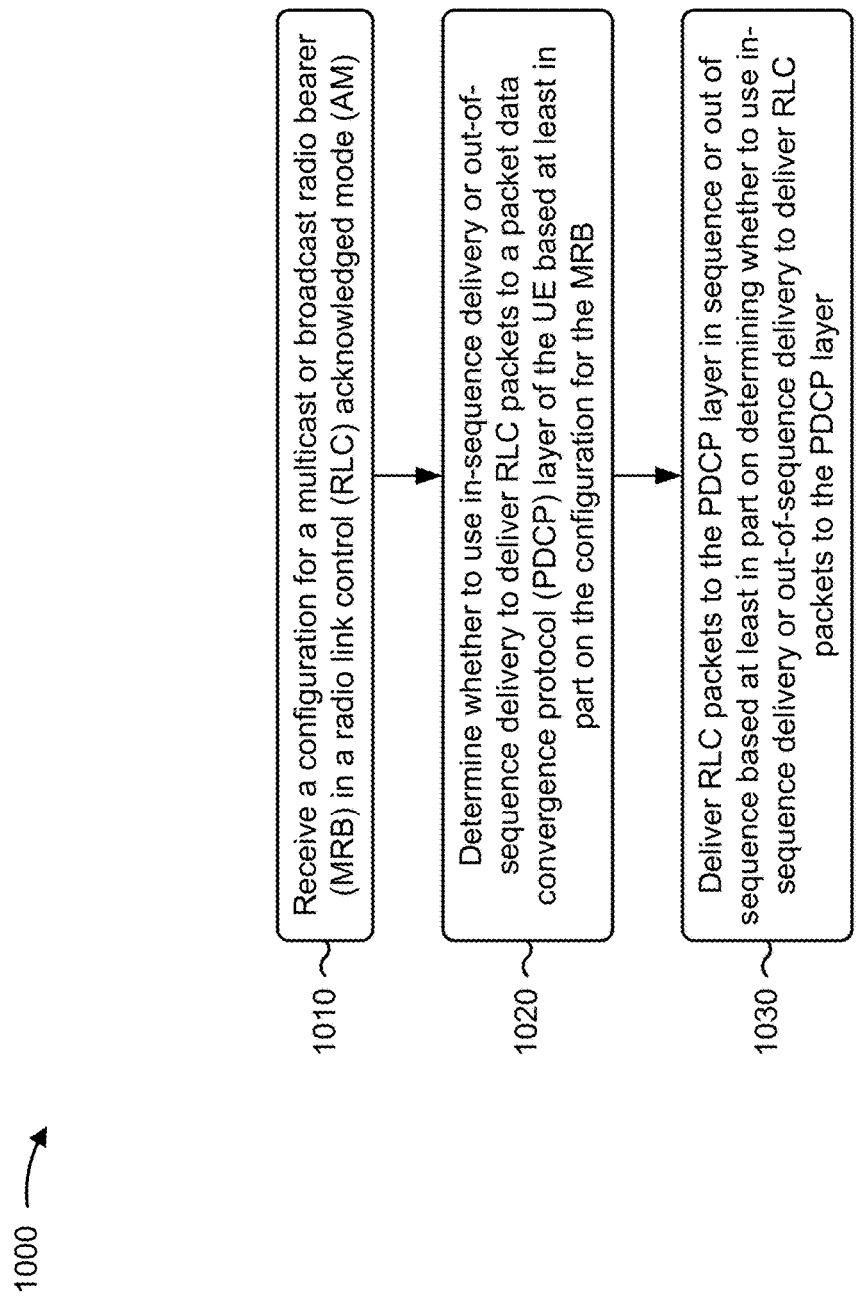
FIG. 10 is a flowchart illustrating an example process performed by a UE in accordance with various aspects of the present disclosure.

FIG. 10 is a diagram illustrating an example process performed, for example, by a UE, in accordance with various aspects of the present disclosure. The example process is an example where the UE (for example, UE 120) performs operations associated with operating in an RLC AM using an MRB.

As shown in FIG. 10, in some aspects, the process may include receiving a configuration for an MRB in an RLC AM (block 1010). For example, the UE (for example, using receive processor 258, controller/processor 280, or memory 282, among other examples) may receive a configuration for an MRB in an RLC AM, as described above.

As further shown in FIG. 10, in some aspects, the process may include determining whether to use in-sequence delivery or out-of-sequence delivery to deliver RLC packets to a PDCP layer of the UE based at least in part on the configuration for the MRB (block 1020). For example, the UE (for example, using receive processor 258, transmit processor 264, controller/processor 280, or memory 282, among other examples) may determine whether to use in-sequence delivery or out-of-sequence delivery to deliver RLC packets to a PDCP layer of the UE based at least in part on the configuration for the MRB, as described above.

As further shown in FIG. 10, in some aspects, the process may include delivering RLC packets to the PDCP layer in sequence or out of sequence based at least in part on determining whether to use in-sequence delivery or out-of-sequence delivery to deliver RLC packets to the PDCP layer (block 1030). For example, the UE (for example, using controller/processor 280, or memory 282, among other examples) may deliver RLC packets to the PDCP layer in sequence or out of sequence based at least in part on determining whether to use in-sequence delivery or out-of-sequence delivery to deliver RLC packets to the PDCP layer, as described above.

The process may include additional aspects, such as any single aspect or any combination of aspects described below or in connection with one or more other processes described elsewhere herein.

In a first aspect, determining whether to use in-sequence delivery or out-of-sequence delivery to deliver RLC packets to the PDCP layer comprises determining whether to use in-sequence delivery or out-of-sequence delivery based at least in part on whether downlink PDCP duplication is configured for the MRB.

In a second aspect, alone or in combination with the first aspect, determining whether to use in-sequence delivery or out-of-sequence delivery to deliver RLC packets to the PDCP layer comprises determining to use out-of-sequence delivery if downlink PDCP duplication is configured for the MRB.

In a third aspect, alone or in combination with one or more of the first and second aspects, determining whether to use in-sequence delivery or out-of-sequence delivery to deliver RLC packets to the PDCP layer comprises determining to use in-sequence delivery if PDCP duplication is not configured for the MRB.

In a fourth aspect, alone or in combination with one or more of the first through third aspects, determining whether to use in-sequence delivery or out-of-sequence delivery to deliver RLC packets to the PDCP layer comprises determining whether to use in-sequence delivery or out-of-sequence delivery based at least in part on an RLC configuration if PDCP duplication is not configured for the MRB.

Although FIG. 10 shows example blocks of the process, in some aspects, the process may include additional blocks, fewer blocks, different blocks, or differently arranged blocks than those depicted in FIG. 10. Additionally or alternatively, two or more of the blocks of the process may be performed in parallel.

Figure 11:
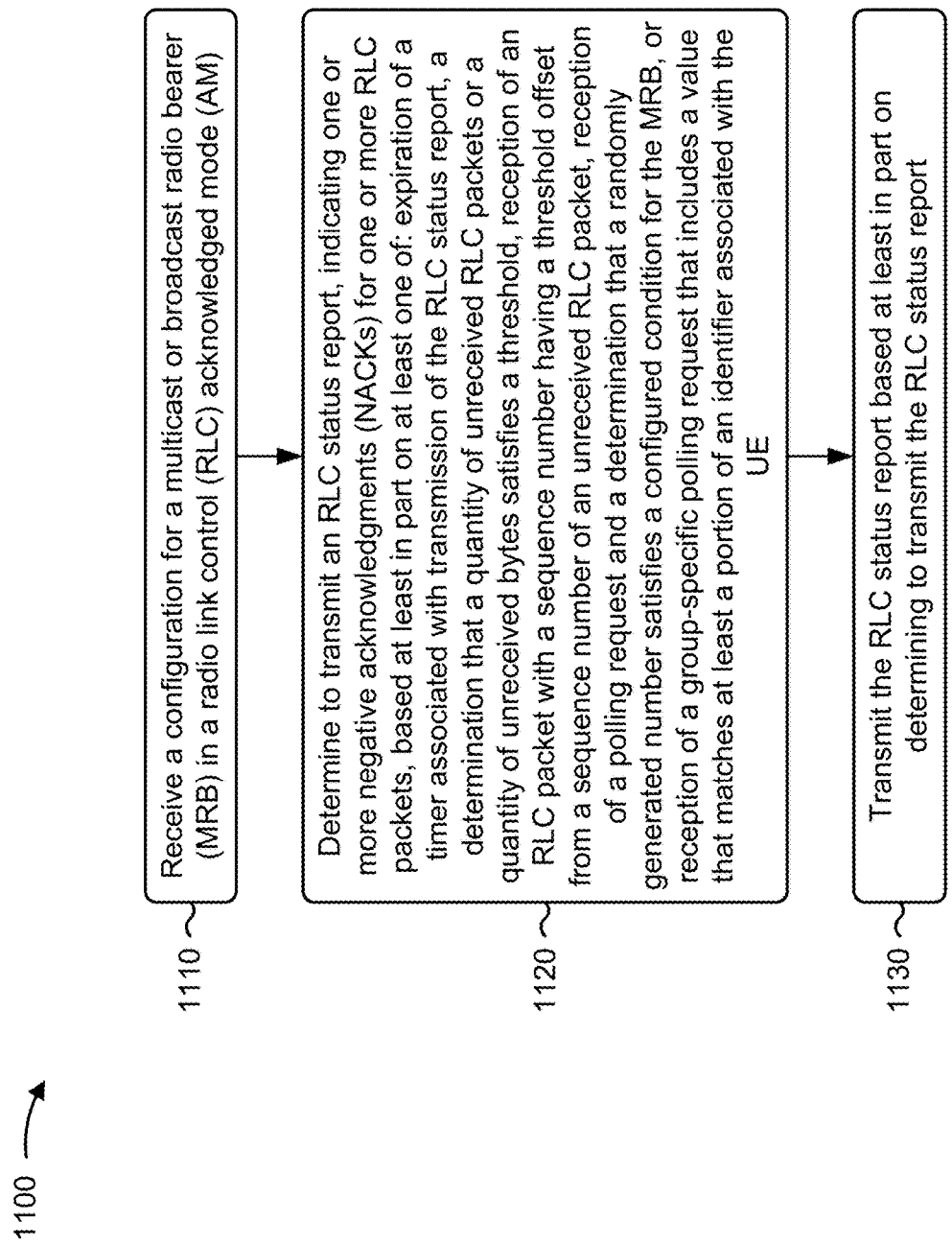
FIG. 11 is a flowchart illustrating an example process performed by a UE in accordance with various aspects of the present disclosure.

FIG. 11 is a diagram illustrating an example process performed, for example, by a UE, in accordance with various aspects of the present disclosure. The example process is an example where the UE (for example, UE 120) performs operations associated with operating in an RLC AM using an MRB.

As shown in FIG. 11, in some aspects, the process may include receiving a configuration for an MRB in an RLC AM (block 1110). For example, the UE (for example, using receive processor 258, controller/processor 280, or memory 282, among other examples) may receive a configuration for an MRB in an RLC AM, as described above.

As further shown in FIG. 11, in some aspects, the process may include determining to transmit an RLC status report, indicating one or more NACKs for one or more RLC packets, based at least in part on at least one of: expiration of a timer associated with transmission of the RLC status report, a determination that a quantity of unreceived RLC packets or a quantity of unreceived bytes satisfies a threshold, reception of an RLC packet with a sequence number having a threshold offset from a sequence number of an unreceived RLC packet, reception of a polling request and a determination that a randomly generated number satisfies a configured condition for the MRB, or reception of a group-specific polling request that includes a value that matches at least a portion of an identifier associated with the UE (block 1120). For example, the UE (for example, using receive processor 258, transmit processor 264, controller/processor 280, or memory 282, among other examples) may determine to transmit an RLC status report, indicating one or more NACKs for one or more RLC packets, as described above. In some aspects, the UE may determine to transmit the RLC status report based at least in part on at least one of: expiration of a timer associated with transmission of the RLC status report, a determination that a quantity of unreceived RLC packets or a quantity of unreceived bytes satisfies a threshold, reception of an RLC packet with a sequence number having a threshold offset from a sequence number of an unreceived RLC packet, reception of a polling request and a determination that a randomly generated number satisfies a configured condition for the MRB, reception of a group-specific polling request that includes a value that matches at least a portion of an identifier associated with the UE, or a combination thereof.

As further shown in FIG. 11, in some aspects, the process may include transmitting the RLC status report based at least in part on determining to transmit the RLC status report (block 1130). For example, the UE (for example, using transmit processor 264, controller/processor 280, or memory 282, among other examples) may transmit the RLC status report based at least in part on determining to transmit the RLC status report, as described above.

The process may include additional aspects, such as any single aspect or any combination of aspects described below or in connection with one or more other processes described elsewhere herein.

In some aspects, the identifier associated with the UE includes at least one of a subscription permanent identifier, an international mobile subscriber identity, a cell radio network temporary identifier, a group radio network temporary identifier, or a combination thereof.

Although FIG. 11 shows example blocks of the process, in some aspects, the process may include additional blocks, fewer blocks, different blocks, or differently arranged blocks than those depicted in FIG. 11. Additionally or alternatively, two or more of the blocks of the process may be performed in parallel.

Figure 12:
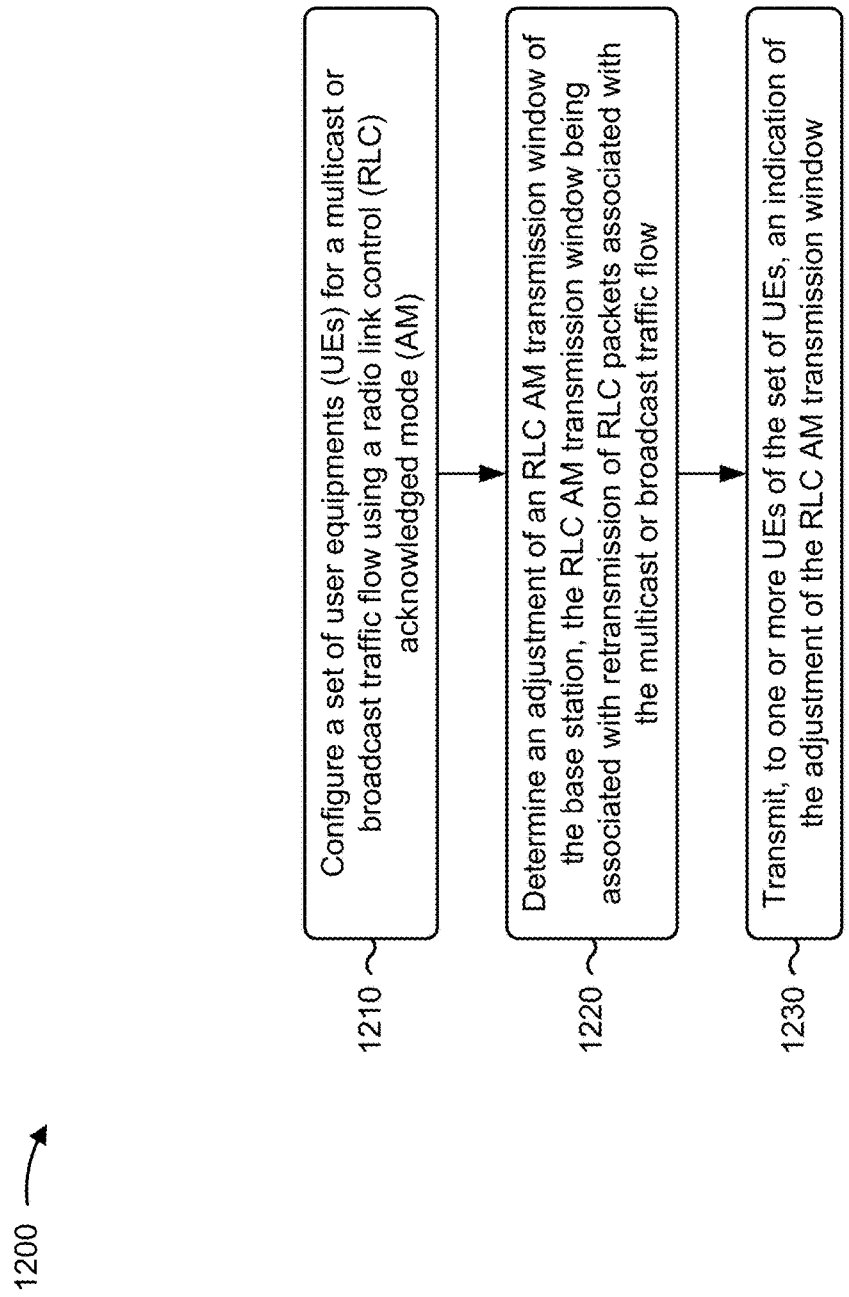
FIG. 12 is a flowchart illustrating an example process performed by a base station in accordance with various aspects of the present disclosure.

FIG. 12 is a diagram illustrating an example process performed, for example, by a base station, in accordance with various aspects of the present disclosure. The example process is an example where the base station (for example, base station 110) performs operations associated with operating in an RLC AM using an MRB.

As shown in FIG. 12, in some aspects, the process may include configuring a set of UEs for a multicast or broadcast traffic flow using an RLC AM (block 1210). For example, the base station (for example, using transmit processor 220, receive processor 238, controller/processor 240, or memory 242, among other examples) may configure a set of UEs for a multicast or broadcast traffic flow using an RLC AM, as described above.

As further shown in FIG. 12, in some aspects, the process may include determining an adjustment of an RLC AM transmission window of the base station, the RLC AM transmission window being associated with retransmission of RLC packets associated with the multicast or broadcast traffic flow (block 1220). For example, the base station (for example, using transmit processor 220, receive processor 238, controller/processor 240, or memory 242, among other examples) may determine an adjustment of an RLC AM transmission window of the base station, the RLC AM transmission window being associated with retransmission of RLC packets associated with the multicast or broadcast traffic flow, as described above.

As further shown in FIG. 12, in some aspects, the process may include transmitting, to one or more UEs of the set of UEs, an indication of the adjustment of the RLC AM transmission window (block 1230). For example, the base station (for example, using transmit processor 220, controller/processor 240, or memory 242, among other examples) may transmit, to one or more UEs of the set of UEs, an indication of the adjustment of the RLC AM transmission window, as described above.

The process may include additional aspects, such as any single aspect or any combination of aspects described below or in connection with one or more other processes described elsewhere herein.

In a first aspect, determining the adjustment of the RLC AM transmission window comprises determining the adjustment based at least in part on expiration of a timer, reception of a hybrid automatic repeat request failure indication from a medium access control layer, or transmitting a threshold number of retransmissions.

In a second aspect, alone or in combination with the first aspect, the indication of the adjustment of the RLC AM transmission window is transmitted in a status control protocol data unit or another RLC control protocol data unit.

In a third aspect, alone or in combination with one or more of the first and second aspects, the indication of the adjustment of the RLC AM transmission window indicates a sequence number of a start of the RLC AM transmission window.

In a fourth aspect, alone or in combination with one or more of the first through third aspects, the indication of the adjustment of the RLC AM transmission window is transmitted periodically or based at least in part on a number of retransmissions of RLC packets by the base station.

In a fifth aspect, alone or in combination with one or more of the first through fourth aspects, the indication of the adjustment of the RLC AM transmission window is transmitted to all UEs in the set of UEs.

In a sixth aspect, alone or in combination with one or more of the first through fifth aspects, the configuration indicates a maximum window size of an RLC AM reception window for an MRB configured for a UE of the set of UEs, the RLC AM reception window is associated with reassembly of RLC packets associated with the MRB.

In a seventh aspect, alone or in combination with one or more of the first through sixth aspects, the process includes transmitting an initial transmission as an M/B transmission via an MRB and transmitting a retransmission as either an M/B transmission or a unicast transmission via one of the MRB or a dedicated radio bearer.

In an eighth aspect, alone or in combination with one or more of the first through seventh aspects, the process includes determining whether to transmit the retransmission as the M/B transmission or the unicast transmission based at least in part on at least one of a quantity of UEs indicating a NACK in RLC status reports, a quantity of NACKs in the RLC status reports, a quantity of RLC status reports that include a NACK, or a combination thereof.

In a ninth aspect, alone or in combination with one or more of the first through eighth aspects, the process includes determining the adjustment of the RLC AM transmission window of the base station based at least in part on a determination that a timer, associated with receiving NACK feedback from the set of UEs, has expired.

Although FIG. 12 shows example blocks of the process, in some aspects, the process may include additional blocks, fewer blocks, different blocks, or differently arranged blocks than those depicted in FIG. 12. Additionally or alternatively, two or more of the blocks of the process may be performed in parallel.

Figure 13:
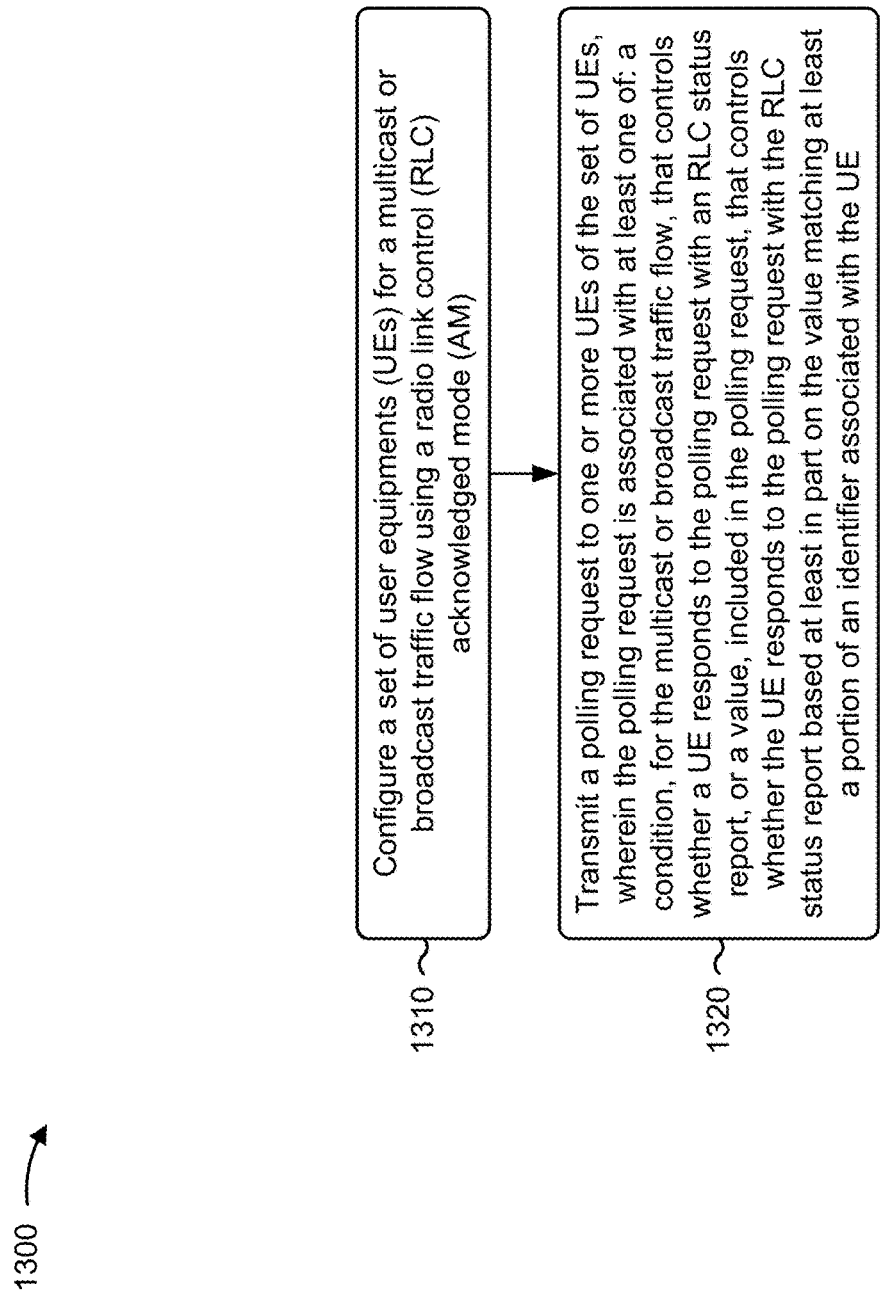
FIG. 13 is a flowchart illustrating an example process performed by a base station in accordance with various aspects of the present disclosure.

FIG. 13 is a diagram illustrating an example process performed, for example, by a base station, in accordance with various aspects of the present disclosure. The example process is an example where the base station (for example, base station 110) performs operations associated with operating in an RLC AM using an MRB.

As shown in FIG. 13, in some aspects, the process may include configuring a set of UEs for a multicast or broadcast traffic flow using an RLC AM (block 1310). For example, the base station (for example, using transmit processor 220, receive processor 238, controller/processor 240, or memory 242, among other examples) may configure a set of UEs for a multicast or broadcast traffic flow using an RLC AM, as described above.

As further shown in FIG. 13, in some aspects, the process may include transmitting a polling request to one or more UEs of the set of UEs, wherein the polling request is associated with at least one of: a condition, for the multicast or broadcast traffic flow, that controls whether a UE responds to the polling request with an RLC status report, or a value, included in the polling request, that controls whether the UE responds to the polling request with the RLC status report based at least in part on the value matching at least a portion of an identifier associated with the UE (block 1320). For example, the base station (for example, using transmit processor 220, controller/processor 240, or memory 242, among other examples) may transmit a polling request to one or more UEs of the set of UEs, as described above. In some aspects, the polling request is associated with at least one of a condition, for the multicast or broadcast traffic flow, that controls whether a UE responds to the polling request with an RLC status report, or a value, included in the polling request, that controls whether the UE responds to the polling request with the RLC status report based at least in part on the value matching at least a portion of an identifier associated with the UE.

The process may include additional aspects, such as any single aspect or any combination of aspects described below or in connection with one or more other processes described elsewhere herein.

In a first aspect, the condition is configured for the one or more UEs.

In a second aspect, alone or in combination with the first aspect, the polling request is a group-specific polling request associated with a subset of the set of UEs.

In a third aspect, alone or in combination with one or more of the first and second aspects, the identifier associated with the UE includes at least one of a subscription permanent identifier, an international mobile subscriber identity, a cell radio network temporary identifier, a group radio network temporary identifier, or a combination thereof.

Although FIG. 13 shows example blocks of the process, in some aspects, the process may include additional blocks, fewer blocks, different blocks, or differently arranged blocks than those depicted in FIG. 13. Additionally or alternatively, two or more of the blocks of the process may be performed in parallel.

Figure 14:
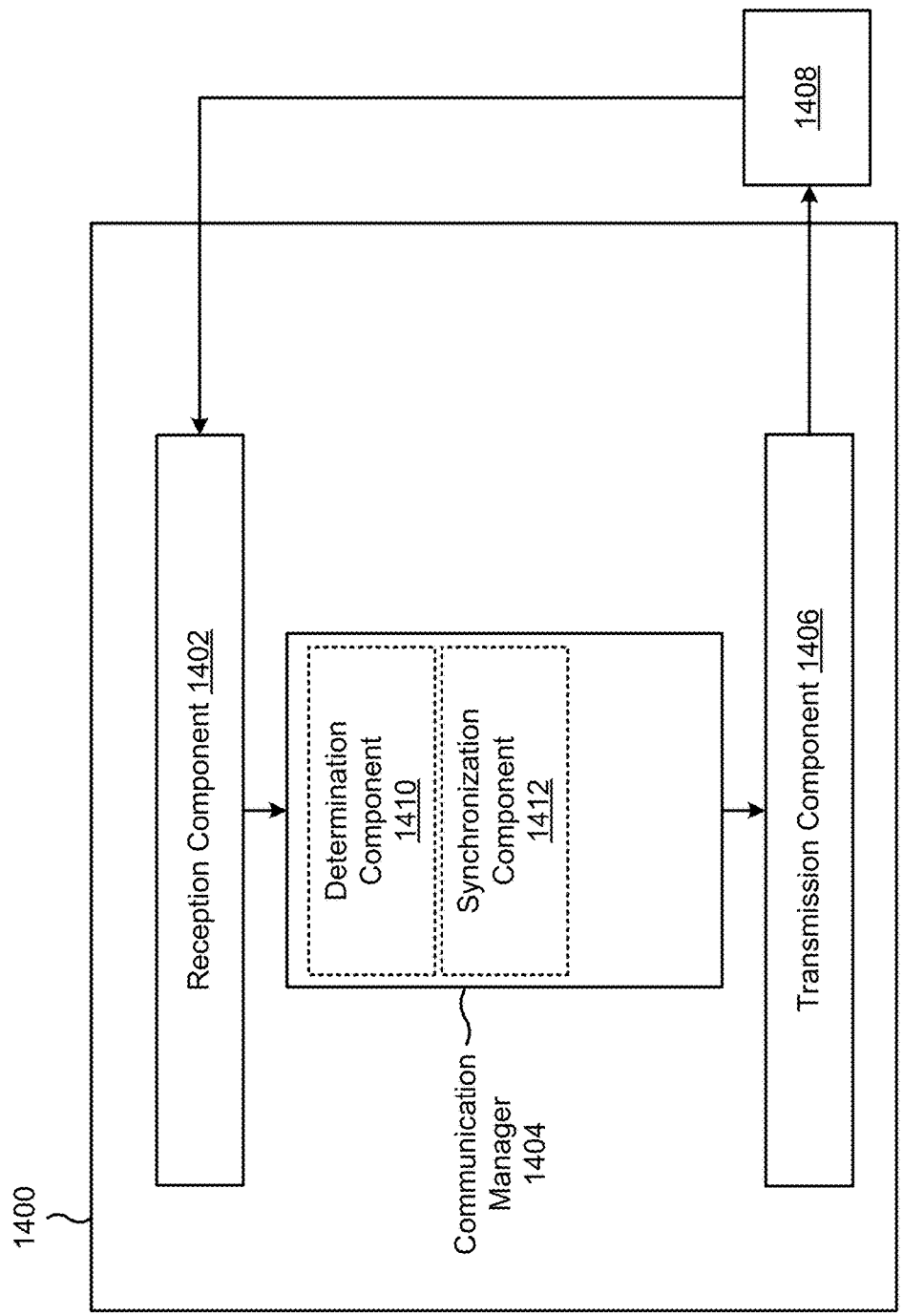
FIGS. 14-18 are block diagrams of example apparatuses for wireless communication in accordance with various aspects of the present disclosure.

FIG. 14 is a block diagram of an example apparatus 1400 for wireless communication in accordance with various aspects of the present disclosure. The apparatus 1400 may be a UE, or a UE may include the apparatus 1400. In some aspects, the apparatus 1400 includes a reception component 1402, a communication manager 1404, and a transmission component 1406, which may be in communication with one another (for example, via one or more buses). As shown, the apparatus 1400 may communicate with another apparatus 1408 (such as a UE, a base station, or another wireless communication device) using the reception component 1402 and the transmission component 1406.

In some aspects, the apparatus 1400 may be configured to perform one or more operations described herein in connection with FIGS. 6-8. Additionally or alternatively, the apparatus 1400 may be configured to perform one or more processes described herein, such as process 900 of FIG. 9, process 1000 of FIG. 10, process 1100 of FIG. 11, or a combination thereof. In some aspects, the apparatus 1400 may include one or more components of the UE described above in connection with FIG. 2.

The reception component 1402 may receive communications, such as reference signals, control information, data communications, or a combination thereof, from the apparatus 1408. The reception component 1402 may provide received communications to one or more other components of the apparatus 1400, such as the communication manager 1404. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a demodulator, a MIMO detector, a receive processor, a controller/processor, a memory, or a combination thereof, of the UE described above in connection with FIG. 2.

The transmission component 1406 may transmit communications, such as reference signals, control information, data communications, or a combination thereof, to the apparatus 1408. In some aspects, the communication manager 1404 may generate communications and may transmit the generated communications to the transmission component 1406 for transmission to the apparatus 1408. In some aspects, the transmission component 1406 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1406 may include one or more antennas, a modulator, a transmit MIMO processor, a transmit processor, a controller/processor, a memory, or a combination thereof, of the UE described above in connection with FIG. 2. In some aspects, the transmission component 1406 may be co-located with the reception component 1402 in a transceiver.

The communication manager 1404 may receive or may cause the reception component 1402 to receive a configuration for an MRB in an RLC AM. The communication manager 1404 may determine an adjustment of an RLC AM transmission window of a base station. The RLC AM transmission window may be associated with retransmission of RLC packets associated with the MRB. The communication manager 1404 may synchronize an RLC AM reception window of the UE with the RLC AM transmission window based at least in part on determining the adjustment of the RLC AM transmission window of the base station. The RLC AM reception window may be associated with reassembly of RLC packets associated with the MRB. In some aspects, the communication manager 1404 may perform one or more operations described elsewhere herein as being performed by one or more components of the communication manager 1404.

The communication manager 1404 may include a controller/processor, a memory, or a combination thereof, of the UE described above in connection with FIG. 2. In some aspects, the communication manager 1404 includes a set of components, such as a determination component 1410, a synchronization component 1412, or a combination thereof. Alternatively, the set of components may be separate and distinct from the communication manager 1404. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive a configuration for an MRB in an RLC AM. The determination component 1410 may determine an adjustment of an RLC AM transmission window of a base station, the RLC AM transmission window being associated with retransmission of RLC packets associated with the MRB. The synchronization component 1412 may synchronize an RLC AM reception window of the UE with the RLC AM transmission window based at least in part on determining the adjustment of the RLC AM transmission window of the base station, the RLC AM reception window being associated with reassembly of RLC packets associated with the MRB. The reception component 1402 may receive an initial transmission as an M/B transmission via the MRB and receive a retransmission as either an M/B transmission or a unicast transmission via one of the MRB or a dedicated radio bearer.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
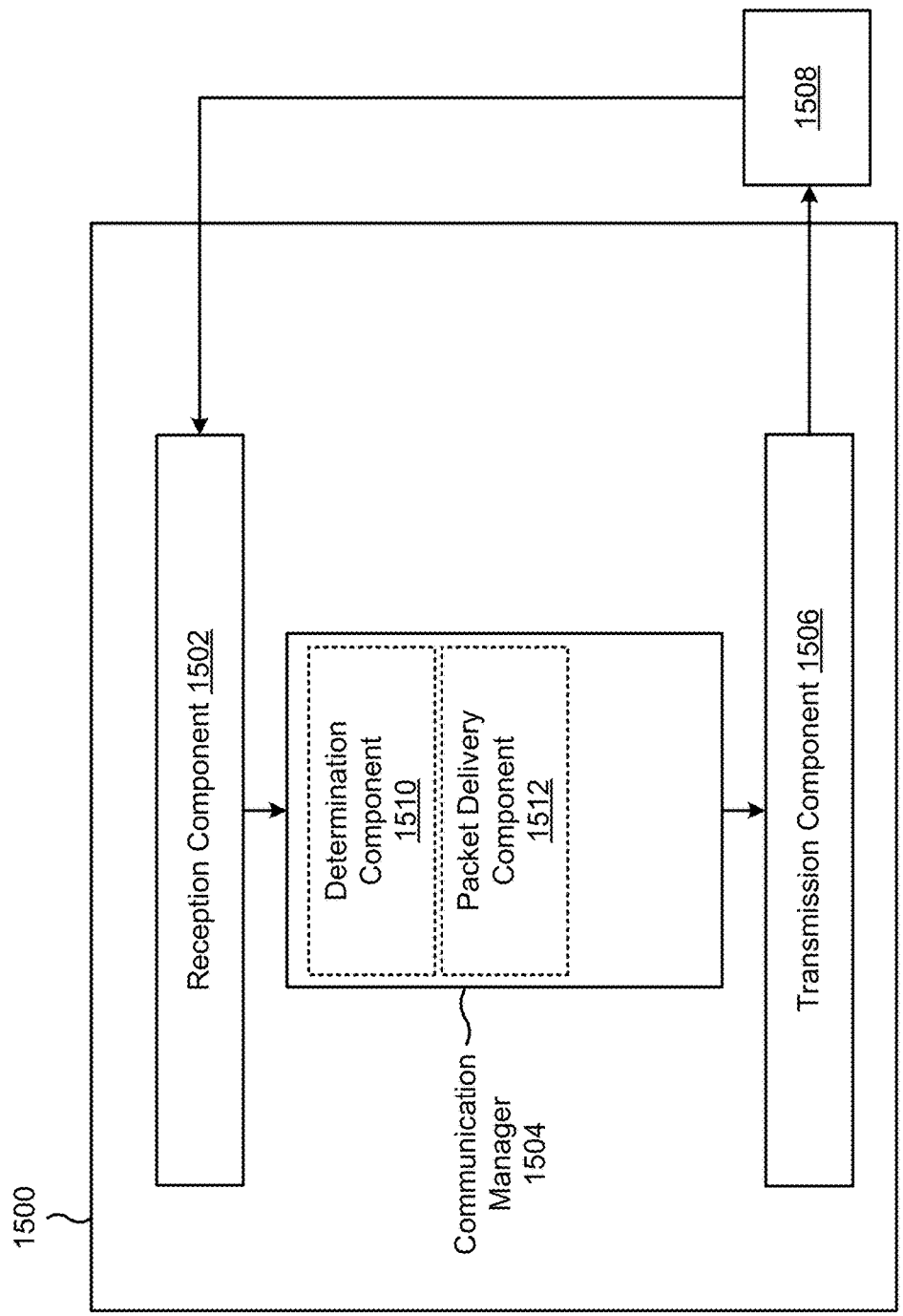

FIG. 15 is a block diagram of an example apparatus 1500 for wireless communication in accordance with various aspects of the present disclosure. The apparatus 1500 may be a UE, or a UE may include the apparatus 1500. In some aspects, the apparatus 1500 includes a reception component 1502, a communication manager 1504, and a transmission component 1506, which may be in communication with one another (for example, via one or more buses). As shown, the apparatus 1500 may communicate with another apparatus 1508 (such as a UE, a base station, or another wireless communication device) using the reception component 1502 and the transmission component 1506.

In some aspects, the apparatus 1500 may be configured to perform one or more operations described herein in connection with FIGS. 6-8. Additionally or alternatively, the apparatus 1500 may be configured to perform one or more processes described herein, such as process 900 of FIG. 9, process 1000 of FIG. 10, process 1100 of FIG. 11, or a combination thereof. In some aspects, the apparatus 1500 may include one or more components of the UE described above in connection with FIG. 2.

The reception component 1502 may receive communications, such as reference signals, control information, data communications, or a combination thereof, from the apparatus 1508. The reception component 1502 may provide received communications to one or more other components of the apparatus 1500, such as the communication manager 1504. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a demodulator, a MIMO detector, a receive processor, a controller/processor, a memory, or a combination thereof, of the UE described above in connection with FIG. 2.

The transmission component 1506 may transmit communications, such as reference signals, control information, data communications, or a combination thereof, to the apparatus 1508. In some aspects, the communication manager 1504 may generate communications and may transmit the generated communications to the transmission component 1506 for transmission to the apparatus 1508. In some aspects, the transmission component 1506 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1506 may include one or more antennas, a modulator, a transmit MIMO processor, a transmit processor, a controller/processor, a memory, or a combination thereof, of the UE described above in connection with FIG. 2. In some aspects, the transmission component 1506 may be co-located with the reception component 1502 in a transceiver.

The communication manager 1504 may receive or may cause the reception component 1502 to receive a configuration for an MRB in an RLC AM. The communication manager 1504 may determine whether to use in-sequence delivery or out-of-sequence delivery to deliver RLC packets to a PDCP layer of the UE based at least in part on the configuration for the MRB. The communication manager 1504 may deliver RLC packets to the PDCP layer in sequence or out of sequence based at least in part on determining whether to use in-sequence delivery or out-of-sequence delivery to deliver RLC packets to the PDCP layer. In some aspects, the communication manager 1504 may perform one or more operations described elsewhere herein as being performed by one or more components of the communication manager 1504.

The communication manager 1504 may include a controller/processor, a memory, or a combination thereof, of the UE described above in connection with FIG. 2. In some aspects, the communication manager 1504 includes a set of components, such as a determination component 1510, a packet delivery component 1512, or a combination thereof. Alternatively, the set of components may be separate and distinct from the communication manager 1504. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive a configuration for an MRB in an RLC AM. The determination component 1510 may determine whether to use in-sequence delivery or out-of-sequence delivery to deliver RLC packets to a PDCP layer of the UE based at least in part on the configuration for the MRB. The packet delivery component 1512 may deliver RLC packets to the PDCP layer in sequence or out of sequence based at least in part on determining whether to use in-sequence delivery or out-of-sequence delivery to deliver RLC packets to the PDCP layer.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
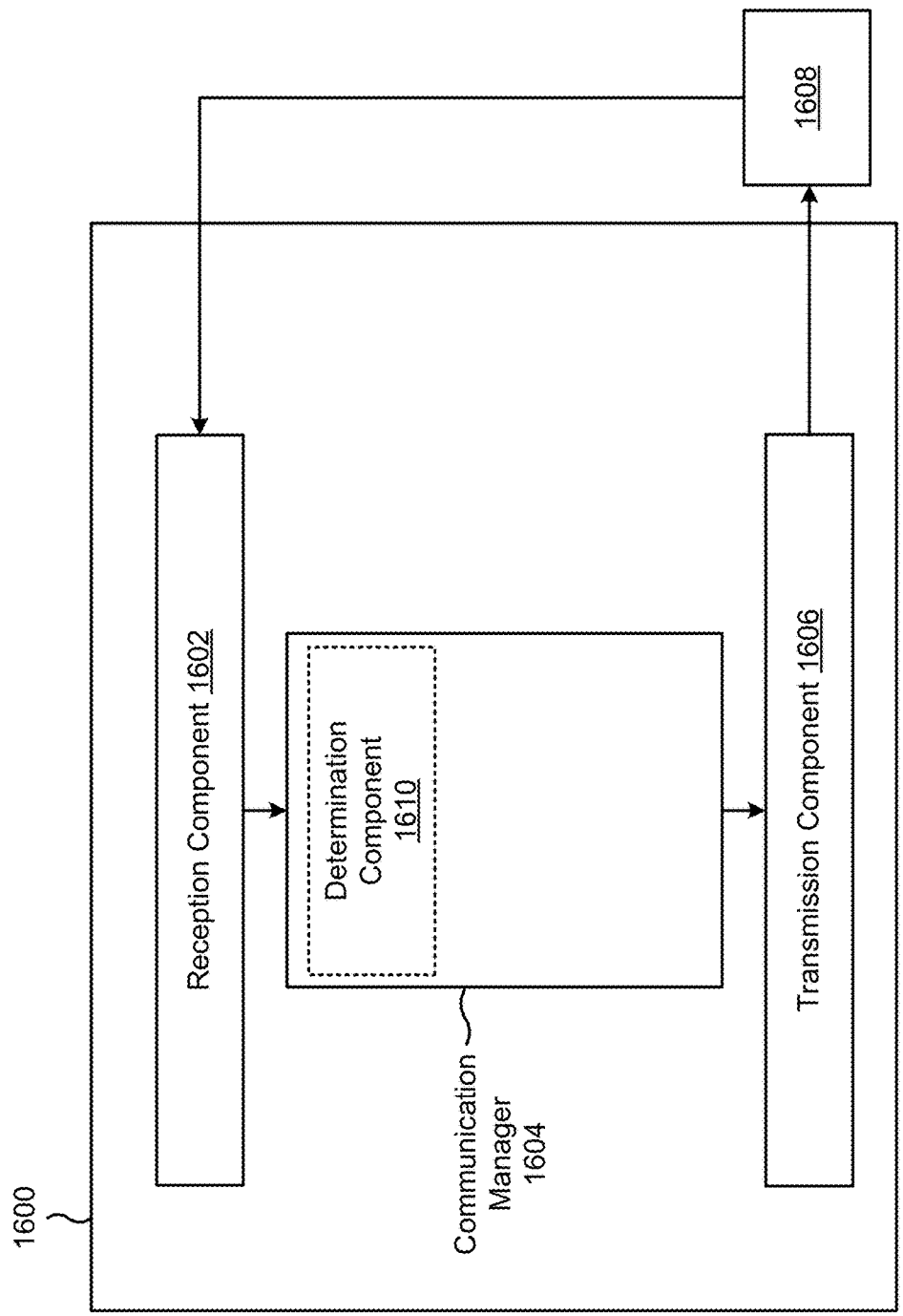

FIG. 16 is a block diagram of an example apparatus 1600 for wireless communication in accordance with various aspects of the present disclosure. The apparatus 1600 may be a UE, or a UE may include the apparatus 1600. In some aspects, the apparatus 1600 includes a reception component 1602, a communication manager 1604, and a transmission component 1606, which may be in communication with one another (for example, via one or more buses). As shown, the apparatus 1600 may communicate with another apparatus 1608 (such as a UE, a base station, or another wireless communication device) using the reception component 1602 and the transmission component 1606.

In some aspects, the apparatus 1600 may be configured to perform one or more operations described herein in connection with FIGS. 6-8. Additionally or alternatively, the apparatus 1600 may be configured to perform one or more processes described herein, such as process 900 of FIG. 9, process 1000 of FIG. 10, process 1100 of FIG. 11, or a combination thereof. In some aspects, the apparatus 1600 may include one or more components of the UE described above in connection with FIG. 2.

The reception component 1602 may receive communications, such as reference signals, control information, data communications, or a combination thereof, from the apparatus 1608. The reception component 1602 may provide received communications to one or more other components of the apparatus 1600, such as the communication manager 1604. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a demodulator, a MIMO detector, a receive processor, a controller/processor, a memory, or a combination thereof, of the UE described above in connection with FIG. 2.

The transmission component 1606 may transmit communications, such as reference signals, control information, data communications, or a combination thereof, to the apparatus 1608. In some aspects, the communication manager 1604 may generate communications and may transmit the generated communications to the transmission component 1606 for transmission to the apparatus 1608. In some aspects, the transmission component 1606 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1606 may include one or more antennas, a modulator, a transmit MIMO processor, a transmit processor, a controller/processor, a memory, or a combination thereof, of the UE described above in connection with FIG. 2. In some aspects, the transmission component 1606 may be co-located with the reception component 1602 in a transceiver.

The communication manager 1604 may receive or may cause the reception component 1602 to receive a configuration for an MRB in an RLC AM. The communication manager 1604 may determine to transmit an RLC status report, indicating one or more NACKs for one or more RLC packets, based at least in part on at least one of expiration of a timer associated with transmission of the RLC status report, a determination that a quantity of unreceived RLC packets or a quantity of unreceived bytes satisfies a threshold, reception of an RLC packet with a sequence number having a threshold offset from a sequence number of an unreceived RLC packet, reception of a polling request and a determination that a randomly generated number satisfies a configured condition for the MRB, or reception of a group-specific polling request that includes a value that matches at least a portion of an identifier associated with the UE. The communication manager 1604 may transmit or may cause the transmission component 1606 to transmit the RLC status report based at least in part on determining to transmit the RLC status report. In some aspects, the communication manager 1604 may perform one or more operations described elsewhere herein as being performed by one or more components of the communication manager 1604.

The communication manager 1604 may include a controller/processor, a memory, or a combination thereof, of the UE described above in connection with FIG. 2. In some aspects, the communication manager 1604 includes a set of components, such as a determination component 1610. Alternatively, the set of components may be separate and distinct from the communication manager 1604. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive a configuration for an MRB in an RLC AM. The determination component 1610 may determine to transmit an RLC status report, indicating one or more NACKs for one or more RLC packets, based at least in part on at least one of expiration of a timer associated with transmission of the RLC status report, a determination that a quantity of unreceived RLC packets or a quantity of unreceived bytes satisfies a threshold, reception of an RLC packet with a sequence number having a threshold offset from a sequence number of an unreceived RLC packet, reception of a polling request and a determination that a randomly generated number satisfies a configured condition for the MRB, or reception of a group-specific polling request that includes a value that matches at least a portion of an identifier associated with the UE. The transmission component 1606 may transmit the RLC status report based at least in part on determining to transmit the RLC status report.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
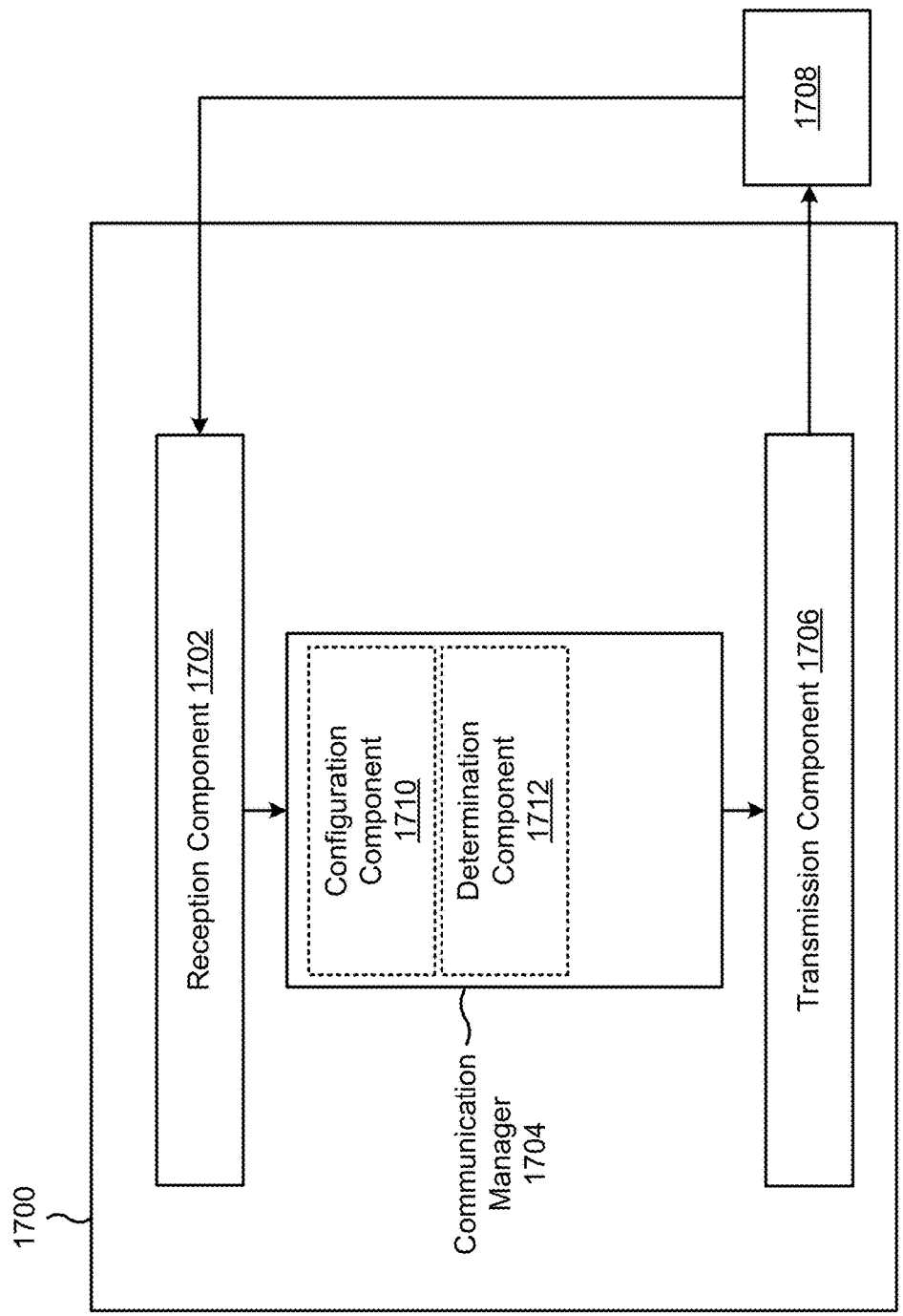

FIG. 17 is a block diagram of an example apparatus 1700 for wireless communication in accordance with various aspects of the present disclosure. The apparatus 1700 may be a base station, or a base station may include the apparatus 1700. In some aspects, the apparatus 1700 includes a reception component 1702, a communication manager 1704, and a transmission component 1706, which may be in communication with one another (for example, via one or more buses). As shown, the apparatus 1700 may communicate with another apparatus 1708 (such as a UE, a base station, or another wireless communication device) using the reception component 1702 and the transmission component 1706.

In some aspects, the apparatus 1700 may be configured to perform one or more operations described herein in connection with FIGS. 6-8. Additionally or alternatively, the apparatus 1700 may be configured to perform one or more processes described herein, such as process 1200 of FIG. 12, process 1300 of FIG. 13, or a combination thereof. In some aspects, the apparatus 1700 may include one or more components of the base station described above in connection with FIG. 2.

The reception component 1702 may receive communications, such as reference signals, control information, data communications, or a combination thereof, from the apparatus 1708. The reception component 1702 may provide received communications to one or more other components of the apparatus 1700, such as the communication manager 1704. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1702 may include one or more antennas, a demodulator, a MIMO detector, a receive processor, a controller/processor, a memory, or a combination thereof, of the base station described above in connection with FIG. 2.

The transmission component 1706 may transmit communications, such as reference signals, control information, data communications, or a combination thereof, to the apparatus 1708. In some aspects, the communication manager 1704 may generate communications and may transmit the generated communications to the transmission component 1706 for transmission to the apparatus 1708. In some aspects, the transmission component 1706 may perform signal processing on the generated communications (such as filtering, amplification, modulation, digital-to-analog conversion, multiplexing, interleaving, mapping, or encoding, among other examples), and may transmit the processed signals to the apparatus 1708. In some aspects, the transmission component 1706 may include one or more antennas, a modulator, a transmit MIMO processor, a transmit processor, a controller/processor, a memory, or a combination thereof, of the base station described above in connection with FIG. 2. In some aspects, the transmission component 1706 may be co-located with the reception component 1702 in a transceiver.

The communication manager 1704 may configure a set of UEs for a multicast or broadcast traffic flow using an RLC AM. The communication manager 1704 may determine an adjustment of an RLC AM transmission window of the base station, the RLC AM transmission window being associated with retransmission of RLC packets associated with the multicast or broadcast traffic flow. The communication manager 1704 may transmit or may cause the transmission component 1706 to transmit, to one or more UEs of the set of UEs, an indication of the adjustment of the RLC AM transmission window. In some aspects, the communication manager 1704 may perform one or more operations described elsewhere herein as being performed by one or more components of the communication manager 1704.

The communication manager 1704 may include a controller/processor, a memory, a scheduler, a communication unit, or a combination thereof, of the base station described above in connection with FIG. 2. In some aspects, the communication manager 1704 includes a set of components, such as a configuration component 1710, a determination component 1712, or a combination thereof. Alternatively, the set of components may be separate and distinct from the communication manager 1704. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The configuration component 1710 may configure a set of UEs for a multicast or broadcast traffic flow using an RLC AM. The determination component 1712 may determine an adjustment of an RLC AM transmission window of the base station, the RLC AM transmission window being associated with retransmission of RLC packets associated with the multicast or broadcast traffic flow. The transmission component 1706 may transmit, to one or more UEs of the set of UEs, an indication of the adjustment of the RLC AM transmission window. The transmission component 1706 may transmit an initial transmission as an M/B transmission via an MRB and may transmit a retransmission as either an M/B transmission or a unicast transmission via one of the MRB or a dedicated radio bearer. The determination component 1712 may determine whether to transmit the retransmission as the M/B transmission or the unicast transmission based at least in part on at least one of a quantity of UEs indicating a NACK in RLC status reports, a quantity of NACKs in the RLC status reports, a quantity of RLC status reports that include a NACK, or a combination thereof. The determination component 1712 may determine the adjustment of the RLC AM transmission window of the base station based at least in part on a determination that a timer, associated with receiving NACK feedback from the set of UEs, has expired.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

Figure 18:
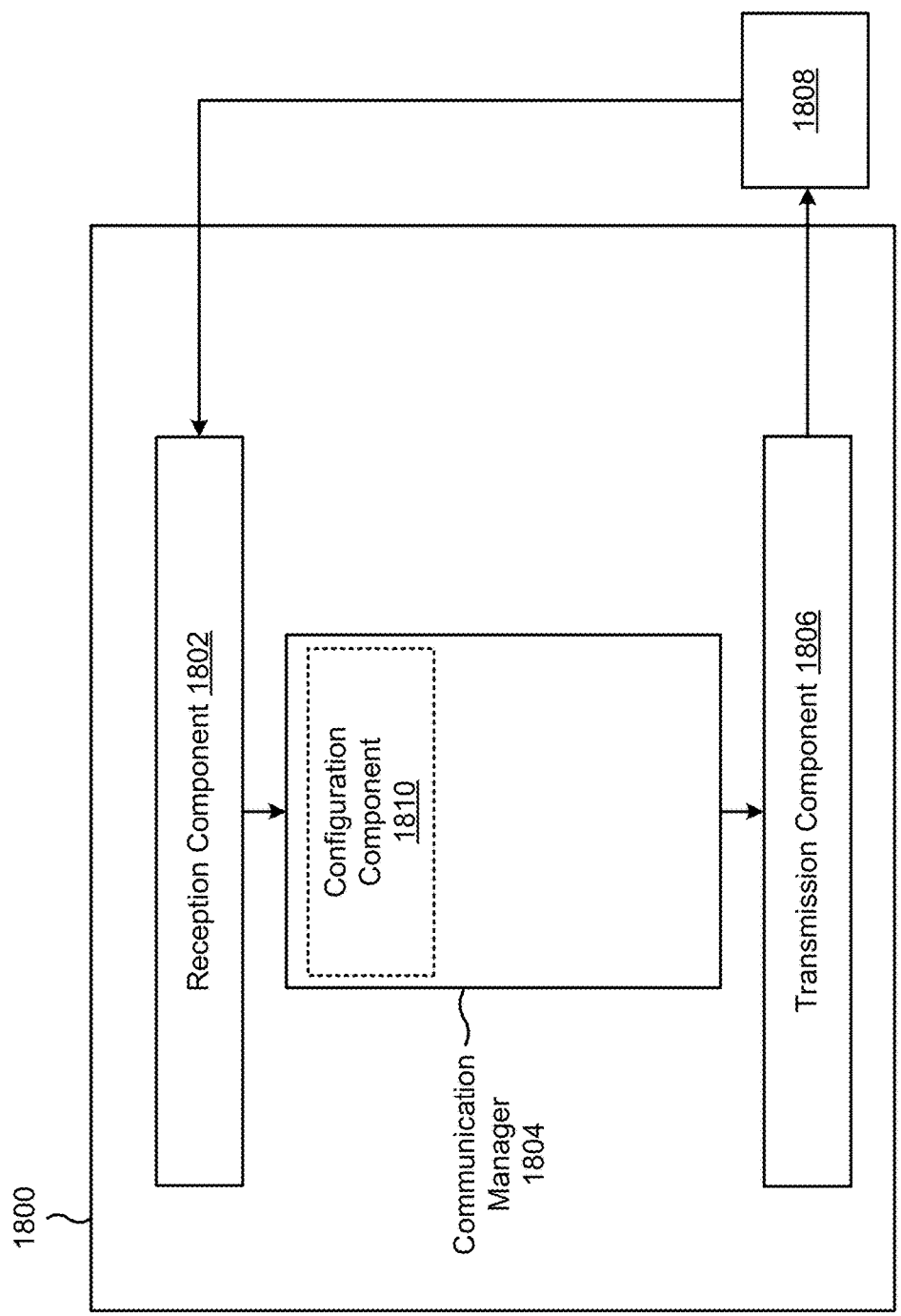

FIG. 18 is a block diagram of an example apparatus 1800 for wireless communication in accordance with various aspects of the present disclosure. The apparatus 1800 may be a base station, or a base station may include the apparatus 1800. In some aspects, the apparatus 1800 includes a reception component 1802, a communication manager 1804, and a transmission component 1806, which may be in communication with one another (for example, via one or more buses). As shown, the apparatus 1800 may communicate with another apparatus 1808 (such as a UE, a base station, or another wireless communication device) using the reception component 1802 and the transmission component 1806.

In some aspects, the apparatus 1800 may be configured to perform one or more operations described herein in connection with FIGS. 6-8. Additionally or alternatively, the apparatus 1800 may be configured to perform one or more processes described herein, such as process 1200 of FIG. 12, process 1300 of FIG. 13, or a combination thereof. In some aspects, the apparatus 1800 may include one or more components of the base station described above in connection with FIG. 2.

The reception component 1802 may receive communications, such as reference signals, control information, data communications, or a combination thereof, from the apparatus 1808. The reception component 1802 may provide received communications to one or more other components of the apparatus 1800, such as the communication manager 1804. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1802 may include one or more antennas, a demodulator, a MIMO detector, a receive processor, a controller/processor, a memory, or a combination thereof, of the base station described above in connection with FIG. 2.

The transmission component 1806 may transmit communications, such as reference signals, control information, data communications, or a combination thereof, to the apparatus 1808. In some aspects, the communication manager 1804 may generate communications and may transmit the generated communications to the transmission component 1806 for transmission to the apparatus 1808. In some aspects, the transmission component 1806 may perform signal processing on the generated communications (such as filtering, amplification, modulation, digital-to-analog conversion, multiplexing, interleaving, mapping, or encoding, among other examples), and may transmit the processed signals to the apparatus 1808. In some aspects, the transmission component 1806 may include one or more antennas, a modulator, a transmit MIMO processor, a transmit processor, a controller/processor, a memory, or a combination thereof, of the base station described above in connection with FIG. 2. In some aspects, the transmission component 1806 may be co-located with the reception component 1802 in a transceiver.

The communication manager 1804 may configure a set of UEs for a multicast or broadcast traffic flow using an RLC AM. The communication manager 1804 may transmit or may cause the transmission component 1806 to transmit a polling request to one or more UEs of the set of UEs, wherein the polling request is associated with at least one of a condition, for the multicast or broadcast traffic flow, that controls whether a UE responds to the polling request with an RLC status report, or a value, included in the polling request, that controls whether the UE responds to the polling request with the RLC status report based at least in part on the value matching at least a portion of an identifier associated with the UE. In some aspects, the communication manager 1804 may perform one or more operations described elsewhere herein as being performed by one or more components of the communication manager 1804.

The communication manager 1804 may include a controller/processor, a memory, a scheduler, a communication unit, or a combination thereof, of the base station described above in connection with FIG. 2. In some aspects, the communication manager 1804 includes a set of components, such as a configuration component 1810. Alternatively, the set of components may be separate and distinct from the communication manager 1804. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The configuration component 1810 may configure a set of UEs for a multicast or broadcast traffic flow using an RLC AM. The transmission component 1806 may transmit a polling request to one or more UEs of the set of UEs, wherein the polling request is associated with at least one of a condition, for the multicast or broadcast traffic flow, that controls whether a UE responds to the polling request with an RLC status report, or a value, included in the polling request, that controls whether the UE responds to the polling request with the RLC status report based at least in part on the value matching at least a portion of an identifier associated with the UE.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally or alternatively, a set of (one or more) components shown in FIG. 18 may perform one or more functions described as being performed by another set of components shown in FIG. 18.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a configuration for a multicast or broadcast radio bearer (MRB) in a radio link control (RLC) acknowledged mode (AM), the configuration including a packet data convergence protocol (PDCP) duplication configuration indicating whether PDCP duplication is enabled or disabled;
    receiving an indication of an adjustment of an RLC AM transmission window of a network entity, the RLC AM transmission window being adjusted based at least in part on a threshold quantity of retransmissions of RLC packets associated with the MRB being satisfied;
    synchronizing an RLC AM reception window of the UE with the RLC AM transmission window using the adjustment of the RLC AM transmission window, the RLC AM reception window being associated with reassembly of the RLC packets;
    delivering the RLC packets to a PDCP layer using out-of-sequence delivery,
        out-of-sequence delivery being used to deliver the RLC packets to the PDCP layer in response to:
            the PDCP duplication configuration indicating that PDCP duplication is enabled for the MRB, or
            the PDCP duplication configuration indicating that PDCP duplication is disabled for the MRB and an RLC configuration indicating to use out-of-sequence delivery;
    receiving a polling request associated with a threshold value indicated in the configuration for the MRB;
    generating, based at least in part on receiving the polling request, a random number; and
    transmitting an RLC status report, indicating one or more negative acknowledgments (NACKs) for one or more RLC packets, based at least in part on the random number satisfying the threshold value.

2. The method of claim 1, wherein receiving the indication of the adjustment of the RLC AM transmission window comprises receiving the indication of the adjustment of the RLC AM transmission window based at least in part on expiration of a timer.

3. The method of claim 1, wherein receiving the indication of the adjustment of the RLC AM transmission window comprises receiving the indication of the adjustment of the RLC AM transmission window periodically.

4. The method of claim 1, wherein receiving the indication of the adjustment of the RLC AM transmission window comprises receiving the indication of the adjustment of the RLC AM transmission window in at least one of: a status control protocol data unit, or another RLC control protocol data unit.

5. The method of claim 1, wherein the indication of the adjustment of the RLC AM transmission window indicates a sequence number of a start of the RLC AM transmission window.

6. The method of claim 1, wherein the configuration for the MRB indicates a maximum window size of the RLC AM reception window for the MRB.

7. The method of claim 1, further comprising receiving an initial transmission as a multicast or broadcast (M/B) transmission via the MRB and receiving a retransmission as either an M/B transmission or a unicast transmission via one of the MRB or a dedicated radio bearer.

8. The method of claim 1, wherein transmitting the RLC status report comprises:
    transmitting the RLC status report based at least in part on at least one of:
        expiration of a timer associated with transmission of the RLC status report,
        a quantity of unreceived RLC packets or a quantity of unreceived bytes satisfying a threshold,
        reception of an RLC packet with a sequence number having a threshold offset from a sequence number of an unreceived RLC packet, or
        reception of a group-specific polling request that includes a value that matches at least a portion of an identifier associated with the UE.

9. The method of claim 1, wherein transmitting the RLC status report comprises:
    transmitting the RLC status report based at least in part on reception of a group-specific polling request including a value that matches at least a portion of an identifier associated with the UE, wherein the group-specific polling request triggers a response from a subset of all UEs subscribed to receive the RLC packets, and wherein the identifier is at least one of: a subscription permanent identifier (SUPI), an international mobile subscriber identity (IMSI), a cell radio network temporary identifier (C-RNTI), or a group radio network temporary identifier (G-RNTI).

10. A method of wireless communication performed by a network entity, comprising:
    configuring a set of user equipments (UEs) for a multicast or broadcast traffic flow using a radio link control (RLC) acknowledged mode (AM);
    transmitting, to one or more UEs of the set of UEs, a configuration for the multicast or broadcast traffic flow in the RLC AM, the configuration including a packet data convergence protocol (PDCP) duplication configuration indicating whether PDCP duplication is enabled or disabled;
    transmitting, to the one or more UEs, an indication of an adjustment of an RLC AM transmission window of the network entity, the RLC AM transmission window being adjusted based at least in part on a threshold quantity of retransmissions of RLC packets associated with the multicast or broadcast traffic flow being satisfied, and the RLC packets being delivered to a PDCP layer using out-of-sequence delivery,
        out-of-sequence delivery being used to deliver the RLC packets to the PDCP layer in response to:
            the PDCP duplication configuration indicating that PDCP duplication is enabled, or
            the PDCP duplication configuration indicating that PDCP duplication is disabled and an RLC configuration indicating to use out-of-sequence delivery;
    transmitting, to the one or more UEs, a polling request associated with a threshold value indicated in the configuration; and
    receiving an RLC status report, indicating one or more negative acknowledgments (NACKs) for one or more RLC packets, based at least in part on a random number, generated at the one or more UEs, satisfying the threshold value.

11. The method of claim 10, wherein transmitting the indication of the adjustment of the RLC AM transmission window comprises transmitting the indication of the adjustment of the RLC AM transmission window based at least in part on expiration of a timer or reception of a hybrid automatic repeat request failure indication from a medium access control layer.

12. The method of claim 10, wherein transmitting the indication of the adjustment of the RLC AM transmission window comprises transmitting the indication of the adjustment of the RLC AM transmission window in at least one of: a status control protocol data unit, or another RLC control protocol data unit, or a periodic manner.

13. The method of claim 10, wherein the indication of the adjustment of the RLC AM transmission window indicates a sequence number of a start of the RLC AM transmission window.

14. The method of claim 10, wherein transmitting the indication of the adjustment of the RLC AM transmission window comprises transmitting the indication of the adjustment of the RLC AM transmission window to all UEs in the set of UEs.

15. The method of claim 10, wherein the configuration indicates a maximum window size of an RLC AM reception window, wherein the RLC AM reception window is associated with reassembly of RLC packets.

16. The method of claim 10, further comprising transmitting an initial transmission as a multicast or broadcast (M/B) transmission via a multicast or broadcast radio bearer (MRB) and transmitting a retransmission as either an M/B transmission or a unicast transmission via one of the MRB or a dedicated radio bearer.

17. The method of claim 16, further comprising determining whether to transmit the retransmission as the M/B transmission or the unicast transmission based at least in part on at least one of a quantity of UEs indicating a NACK in RLC status reports, a quantity of NACKs in the RLC status reports, or a quantity of RLC status reports that include a NACK.

18. The method of claim 10, further comprising transmitting the indication of the adjustment of the RLC AM transmission window based at least in part on a timer, associated with receiving NACK feedback from the set of UEs, having expired.

19. The method of claim 10, wherein transmitting the polling request comprises:
transmitting a group-specific polling request to the one or more UEs, wherein the group-specific polling request is associated with at least one of:
a condition, for the multicast or broadcast traffic flow, that controls whether a UE responds to the group-specific polling request with the RLC status report, or
a value, wherein the value controls whether the UE responds to the group-specific polling request with the RLC status report based at least in part on the value matching at least a portion of a particular identifier associated with the UE.

20. The method of claim 10, receiving the RLC status report, comprises:
receiving the RLC status report based at least in part on transmission of a group-specific polling request including a value that matches at least a portion of an identifier associated with the one or more UEs, wherein the group-specific polling request triggers a response from a subset of all UEs subscribed to receive the RLC packets, and wherein the identifier is at least one of: a subscription permanent identifier (SUPI), an international mobile subscriber identity (IMSI), a cell radio network temporary identifier (C-RNTI), or a group radio network temporary identifier (G-RNTI).

21. A user equipment (UE) for wireless communication, comprising:

a processing system that includes one or more processors and one or more memories coupled with the one or more memories, the processing system configured to cause the UE to:
receive a configuration for a multicast or broadcast radio bearer (MRB) in a radio link control (RLC) acknowledged mode (AM), the configuration including a packet data convergence protocol (PDCP) duplication configuration indicating whether PDCP duplication is enabled or disabled;
receive an indication of an adjustment of an RLC AM transmission window of a network entity, the RLC AM transmission window being adjusted based at least in part on a threshold quantity of retransmissions of RLC packets associated with the MRB being satisfied;
synchronize an RLC AM reception window of the UE with the RLC AM transmission window using the adjustment of the RLC AM transmission window, the RLC AM reception window being associated with reassembly of the RLC packets;
deliver the RLC packets to a PDCP layer using out-of-sequence delivery in response to:
the PDCP duplication configuration indicating that PDCP duplication is enabled for the MRB, or
the PDCP duplication configuration indicating that PDCP duplication is disabled for the MRB and an RLC configuration indicating to use out-of-sequence delivery;
receive a polling request associated with a threshold value indicated in the configuration for the MRB;
generate, based at least in part on the polling request, a random number; and
transmit an RLC status report, indicating one or more negative acknowledgments (NACKs) for one or more RLC packets, based at least in part on the random number satisfying the threshold value.

22. The UE of claim 21, wherein the processing system, to cause the UE to receive the indication of the adjustment of the RLC AM transmission window, is configured to cause the UE to receive the indication of the adjustment of the RLC AM transmission window based at least in part on expiration of a timer.

23. The UE of claim 21, wherein the one or more processors, to receive the indication of the adjustment of the RLC AM transmission window, are configured to receive the indication of the adjustment of the RLC AM transmission window periodically.

24. The UE of claim 21, wherein the one or more processors, to transmit the RLC status report, are configured to:
transmit the RLC status report based at least in part on at least one of:
expiration of a timer associated with transmission of the RLC status report,
a quantity of unreceived RLC packets or a quantity of unreceived bytes satisfying a threshold,
reception of an RLC packet with a sequence number having a threshold offset from a sequence number of an unreceived RLC packet, or
reception of a group-specific polling request that includes a value that matches at least a portion of an identifier associated with the UE.

25. The UE of claim 21, wherein the processing system, to cause the UE to receive the indication of the adjustment of the RLC AM transmission window, is configured to cause the UE to receive the indication of the adjustment of the RLC AM transmission window in at least one of: a status control protocol data unit, or another RLC control protocol data unit.

26. The UE of claim 21, wherein the processing system is further configured to cause the UE to receive an initial transmission as a multicast or broadcast (M/B) transmission via the MRB and receiving a retransmission as either an M/B transmission or a unicast transmission via one of the MRB or a dedicated radio bearer.

27. A network entity for wireless communication, comprising:
   a processing system that includes one or more processors and one or more memories coupled with the one or more memories, the processing system configured to cause the network entity to:
      configure a set of user equipments (UEs) for a multicast or broadcast traffic flow using a radio link control (RLC) acknowledged mode (AM);
      transmit, to one or more UEs of the set of UEs, a configuration for the multicast or broadcast traffic flow in the RLC AM, the configuration including a packet data convergence protocol (PDCP) duplication configuration indicating whether PDCP duplication is enabled or disabled;
      transmit, to the one or more UEs, an indication of an adjustment of an RLC AM transmission window of the network entity, the RLC AM transmission window being adjusted based at least in part on a threshold quantity of retransmissions of RLC packets associated with the multicast or broadcast traffic flow being satisfied, and the RLC packets being delivered to a PDCP layer using out-of-sequence delivery,
         out-of-sequence delivery being used to deliver the RLC packets to the PDCP layer in response to:
            the PDCP duplication configuration indicating that PDCP duplication is enabled, or
            the PDCP duplication configuration indicating that PDCP duplication is disabled and an RLC configuration indicating to use out-of-sequence delivery;
      transmit, to the one or more UEs, a polling request associated with a threshold value indicated in the configuration; and
      receive an RLC status report, indicating one or more negative acknowledgments (NACKs) for one or more RLC packets, based at least in part on a random number, generated at the one or more UEs, satisfying the threshold value.

28. The network entity of claim 27, wherein the one or more processors, to transmit the indication of the adjustment of the RLC AM transmission window, are configured to transmit the indication of the adjustment of the RLC AM transmission window based at least in part on expiration of a timer or reception of a hybrid automatic repeat request failure indication from a medium access control layer.

29. The network entity of claim 27, wherein the one or more processors, to transmit the polling request, are configured to:
   transmit a group-specific polling request to the one or more UEs, wherein the group-specific polling request is associated with at least one of:
      a condition, for the multicast or broadcast traffic flow, that controls whether a UE responds to the group-specific polling request with the RLC status report, or
      a value, wherein the value controls whether the UE responds to the group-specific polling request with the RLC status report based at least in part on the value matching at least a portion of a particular identifier associated with the UE.

30. The network entity of claim 27, wherein the processing system, to cause the network entity to transmit the indication of the adjustment of the RLC AM transmission window, is configured to cause the network entity to transmit the indication of the adjustment of the RLC AM transmission window in at least one of: a status control protocol data unit, or another RLC control protocol data unit, or a periodic manner.

* * * * *